(12) United States Patent
Nonoyama et al.

(10) Patent No.: US 11,066,092 B2
(45) Date of Patent: Jul. 20, 2021

(54) STEERING WHEEL

(71) Applicants: TOYODA GOSEI CO., LTD., Kiyosu (JP); HONDA MOTOR CO., LTD., Tokyo (JP)

(72) Inventors: Yuki Nonoyama, Kiyosu (JP); Jun Sato, Kiyosu (JP); Sanae Oritaka, Nagoya (JP); Makoto Noda, Wako (JP); Yosuke Iwasaki, Kakamigahara (JP)

(73) Assignees: TOYODA GOSEI CO., LTD., Aichi-pref. (JP); HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 16/689,345

(22) Filed: Nov. 20, 2019

(65) Prior Publication Data

US 2020/0156690 A1    May 21, 2020

(30) Foreign Application Priority Data

Nov. 21, 2018   (JP) .............................. JP2018-218717

(51) Int. Cl.
*B62D 1/06*     (2006.01)
*B60R 11/00*    (2006.01)

(52) U.S. Cl.
CPC ................ *B62D 1/06* (2013.01); *B60R 11/00* (2013.01); *B60R 2011/001* (2013.01)

(58) Field of Classification Search
CPC ........ B62M 3/086; B62M 3/083; B62M 3/08; A43B 5/14; A43B 5/18; Y10T 74/217; Y10T 74/2168
See application file for complete search history.

(56) References Cited

U.S. PATENT DOCUMENTS

| | | | | |
|---|---|---|---|---|
| 3,802,291 A | * | 4/1974 | Young, Jr. ................ | B62D 1/06 74/552 |
| D464,595 S | * | 10/2002 | Zorkendorfer ............... | D12/176 |
| 6,877,397 B2 | * | 4/2005 | Albayrak ................. | B62D 1/06 74/552 |
| 7,392,725 B2 | * | 7/2008 | Yasuda .................... | B62D 1/06 74/552 |

(Continued)

FOREIGN PATENT DOCUMENTS

JP       2018-052187 A     4/2018

*Primary Examiner* — Daniel D Yabut
(74) *Attorney, Agent, or Firm* — Posz Law Group, PLC

(57) ABSTRACT

A steering wheel includes a decorative component and a surface skin on a surface of the rim. The decorative component is formed into a band and a leading-end portion of the decorative component has a tapered form in which an inner edge curves towards an outer circumference of the rim and serves as a curving edge. The surface skin includes a curved-side section adjoining the curving edge and a non-curved-side section adjoining a non-curving edge of the leading-end portion. The curved-side section includes a main body that includes a curving portion which corresponds to the curving edge of the leading-end portion in shape, and an extended portion that extends beyond an apex of the leading-end portion and extends towards the non-curving edge of the leading-end portion of the decorative component. A region of the extended portion beyond the apex is joined to a leading edge of the non-curved-side section.

11 Claims, 22 Drawing Sheets

(56) References Cited

U.S. PATENT DOCUMENTS

| | | | |
|---|---|---|---|
| 2006/0236807 A1* | 10/2006 | Yasuda | B62D 1/06 74/552 |
| 2015/0197272 A1* | 7/2015 | Nonoyama | B62D 1/065 74/552 |
| 2016/0090116 A1* | 3/2016 | Joh | B62D 1/06 74/558 |
| 2017/0166117 A1* | 6/2017 | Nagata | B60Q 3/14 |
| 2018/0086361 A1 | 3/2018 | Maekubo et al. | |

* cited by examiner

STEERING WHEEL

CROSS REFERENCE TO RELATED APPLICATIONS

The Present application claims priority from Japanese Patent Application No. 2018-218717 of Nonoyama, filed on Nov. 21, 2018, the entire disclosure of which is incorporated herein by reference.

BACKGROUND

1. Technical Field

The present invention relates to a steering wheel in which the rim includes a surface skin and a decorative component surrounded by the surface skin.

2. Description of Related Art

JP 2018-052187 A discloses a known steering wheel provided with a decorative component. The steering wheel includes, on the upper surface of the rim, a surface skin and the decorative component surrounded by the surface skin. The decorative component is arranged along the rim in a band shape, and each of the leading ends of the decorative component has a tapered form.

In a steering wheel of this kind, when the surface skin is arranged to surround the leading ends of the decorative component, it is likely that a gap is formed between the tapered leading end of the decorative component and surface skin, unless some measures are taken. Such a gap worsens the appearance of a vicinity of the decorative component.

It would be desirable to provide a steering wheel in which a surface skin and a decorative component are arranged so as not to form a gap between the leading end of the decorative component and surface skin.

SUMMARY

An exemplary embodiment of the invention relates to a steering wheel that includes a rim that is generally annular in shape and adapted to be hand-held for steering and that includes, on the upper surface, at least one decorative component and a surface skin which surrounds the decorative component.

The decorative component is formed into a band shape extending along the rim, and includes at least one leading-end portion that has a tapered form. The leading-end portion includes a first and a second circumferential edges one disposed towards an inner circumference of the rim while the other towards an outer circumference of the rim, and is tapered such that the first circumferential edge curves towards and intersects with the second circumferential edge and forms an apex of the tapered form. Thus the first circumferential edge constitutes a curving edge while the second circumferential edge constitutes a non-curving edge that curves along the rim.

The surface skin includes a curved-side cover section disposed adjacent the curving edge of the leading-end portion of the decorative component, and a non-curved-side cover section disposed adjacent the non-curving edge of the leading-end portion of the decorative component. A slit is formed between the curved-side cover section and the non-curved-side cover section such that the decorative component is set therein.

The curved-side cover section includes:
a main body that includes a curving portion which is disposed adjacent the curving edge of the leading-end portion of the decorative component and corresponds to the curving edge of the leading-end portion in shape; and
an extended portion that extends beyond the apex of the leading-end portion of the decorative component from the main body and extends towards the non-curving edge of the leading-end portion of the decorative component.

The non-curved-side cover section includes, at the leading end apart from the apex of the leading-end portion of the decorative component, a joint edge that is joined with an edge of the extended portion of the curved-side cover section.

Desirably, the extended portion of the curved-side cover section includes, in its edge proximate to the decorative component, a curved edge that curves continuously from the curving portion of the main body and is joined to the joint edge of the non-curved-side cover section.

Further desirably, the rim includes a base on which the surface skin and the decorative component are mounted, and the curved-side cover section and the non-curved-side cover section of the surface skin are arranged on the base in such a manner as to form a setting space in which the decorative component is fitted. The decorative component includes a plurality of mounting projections in the underside, and each of the mounting projections is inserted into and retained by a mounting hole formed in the setting space of the base.

In this instance, one of the mounting projections is desirably disposed in a root region of the leading-end portion of the decorative component.

Furthermore, it is desired that the setting space includes a general region and at least one seat that is raised from the general region, and a terminal mounting hole, which is one of the mounting holes and receives the mounting projection disposed in the root region of the leading-end portion of the decorative component, is formed in the seat. The seat provided with the terminal mounting hole includes one each vertical surface in both of side surfaces facing towards the inner circumference and outer circumference of the rim, each of the vertical surfaces extending generally in an up and down direction. The base further includes two storing grooves in each of which an edge of the curved-side cover section and an edge of the non-curved-side cover section of the surface skin, which edges are opposed to each other across the slit, are fitted. Each of the storing grooves includes a first and a second opposite upright surfaces, and the vertical surface of the seat constitutes either one of the first and the second upright surfaces of each of the storing grooves.

In the steering wheel in accordance with the exemplary embodiment, it is desired that the decorative component includes a decorative portion on the upper side and a mounting base that is disposed on the lower side and mounted on the base of the rim, and that the decorative portion has a greater width than the mounting base except in the leading-end portion.

In this instance, it is desired that, in the leading-end portion of the decorative component, a side surface of the decorative portion and a side surface of the mounting base are generally flush, thereby forming a flat surface around the leading-end portion.

In the steering wheel in accordance with the exemplary embodiment, it is desired that:
the rim includes a bendable portion that is configured to bend when an impact is applied from above such that a region of the rim subjected to the impact bend downward;

the bendable portion is disposed, in an area where the decorative component is arranged, at a position dislocated from the leading-end portion of the decorative component and proximate to the leading-end portion;

the decorative component is arranged to extend across the bendable portion; and two of the plurality of mounting projections are disposed such that one is disposed towards the leading-end portion with respect to the bendable portion and the other away from the leading-end portion with respect to the bendable portion.

In the above instance, it is desired that:

the decorative component includes a plurality of positioning projections that are inserted into corresponding insert holes formed in the base and position the decorative component;

one of the positioning projections is disposed between the two mounting projections one of which is disposed towards the leading-end portion and the other of which away from the leading-end portion each with respect to the bendable portion; and the one of the positioning projections is positioned dislocated from the bendable portion and dislocated from a halfway point between the two mounting projections one of which is disposed towards the leading-end portion and the other of which away from the leading-end portion each with respect to the bendable portion.

In the steering wheel in accordance with the exemplary embodiment, it is desired that:

the surface skin further includes an adjoining cover section that is disposed on a side of the curving edge of the leading-end portion of the decorative component and adjoins the main body of the curved-side cover section, the adjoining cover section being opposed to the non-curved-side cover section across the slit;

a leading edge of the adjoining cover section is located at a position proximate to and dislocated from the leading end-portion of the decorative component and joined with a corresponding edge of the main body of the curved-side cover section; and a seam of the leading edge of the adjoining cover section and the corresponding edge of the main body of the curved-side cover section are fitted in a positioning groove formed in the base.

In this instance, it is desired that:

far-side edges of the main body of the curved-side cover section and the adjoining cover section which are joined together, and far-side edges of the extended portion of the curved-side cover section and the non-curved-side cover section which are joined together, which far-side edges being distant from the slit, are joined together in the inner circumference of the rim;

the decorative component, the curved-side cover section, the non-curved-side cover section, and the adjoining cover section cover a surface of the base in a circumferential direction of a cross section of the rim; and the seam of the leading edge of the adjoining cover section and the edge of the main body of the curved-side cover section is dislocated from a seam of the joint edge of the extended portion of the curved-side cover section and the joint edge of the non-curved-side cover section in a direction extending along the rim.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Especially, in the following detailed description, for purposes of explanation, numerous specific details are set forth in order to provide a thorough understanding of the disclosed embodiments. It will be apparent, however, that one or more embodiments may be practiced without these specific details.

Figure 1:
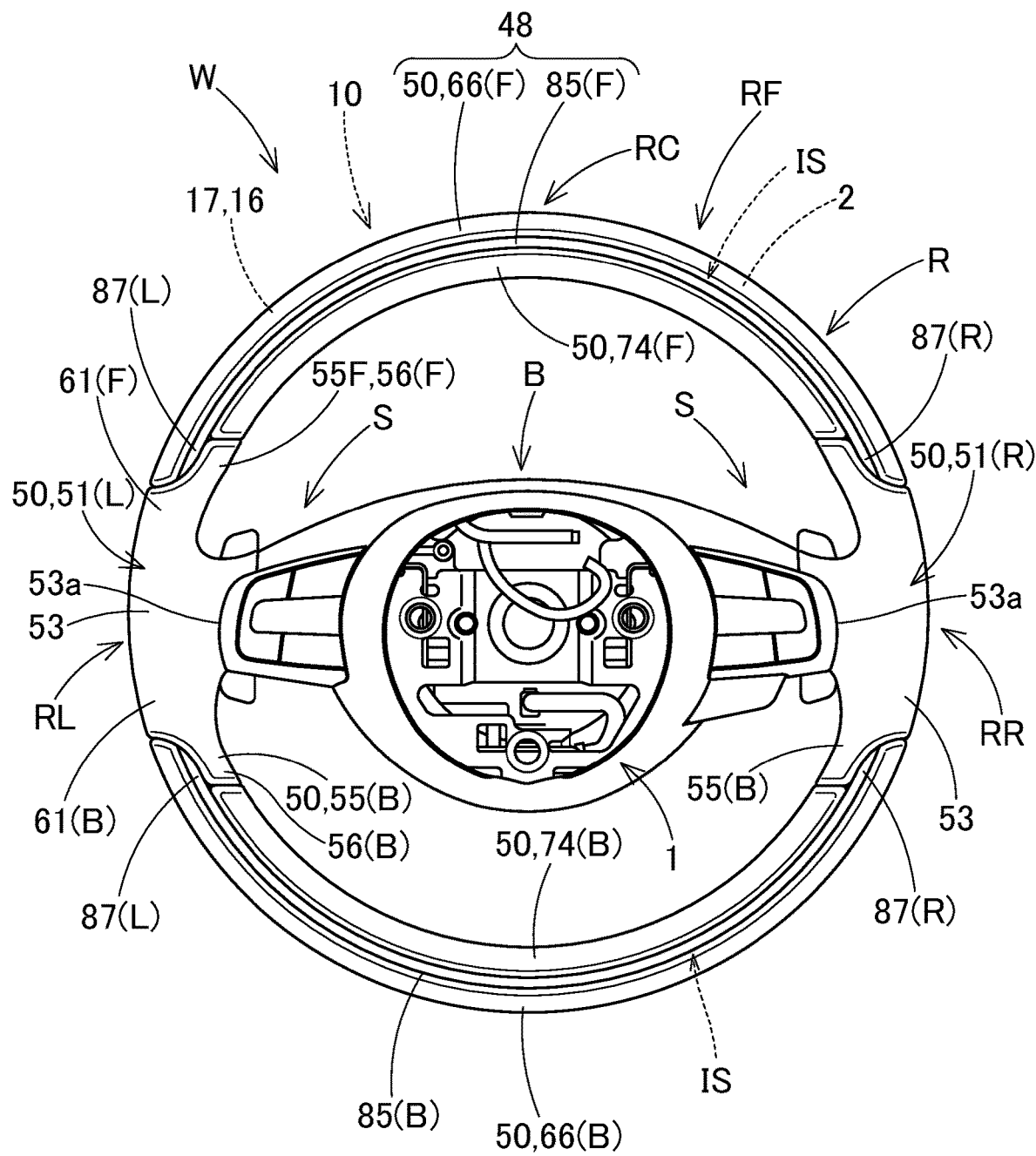
FIG. 1 is a plan view of a steering wheel in accordance with an exemplary embodiment.
Figure 2:
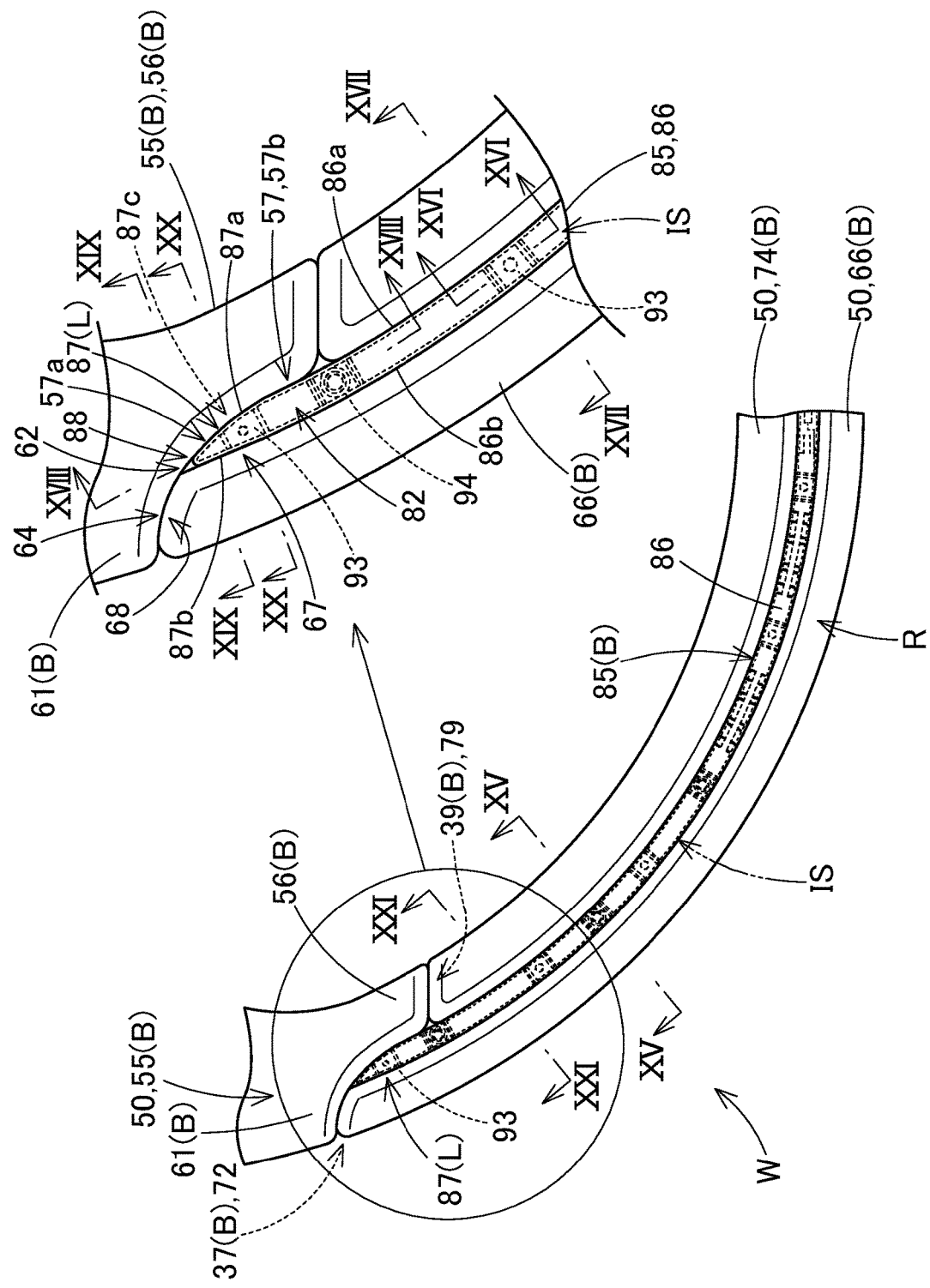
FIG. 2 is a partial plan view of the steering wheel of FIG. 1 showing a vicinity of a leading-end portion of a decorative component.
Figure 3:
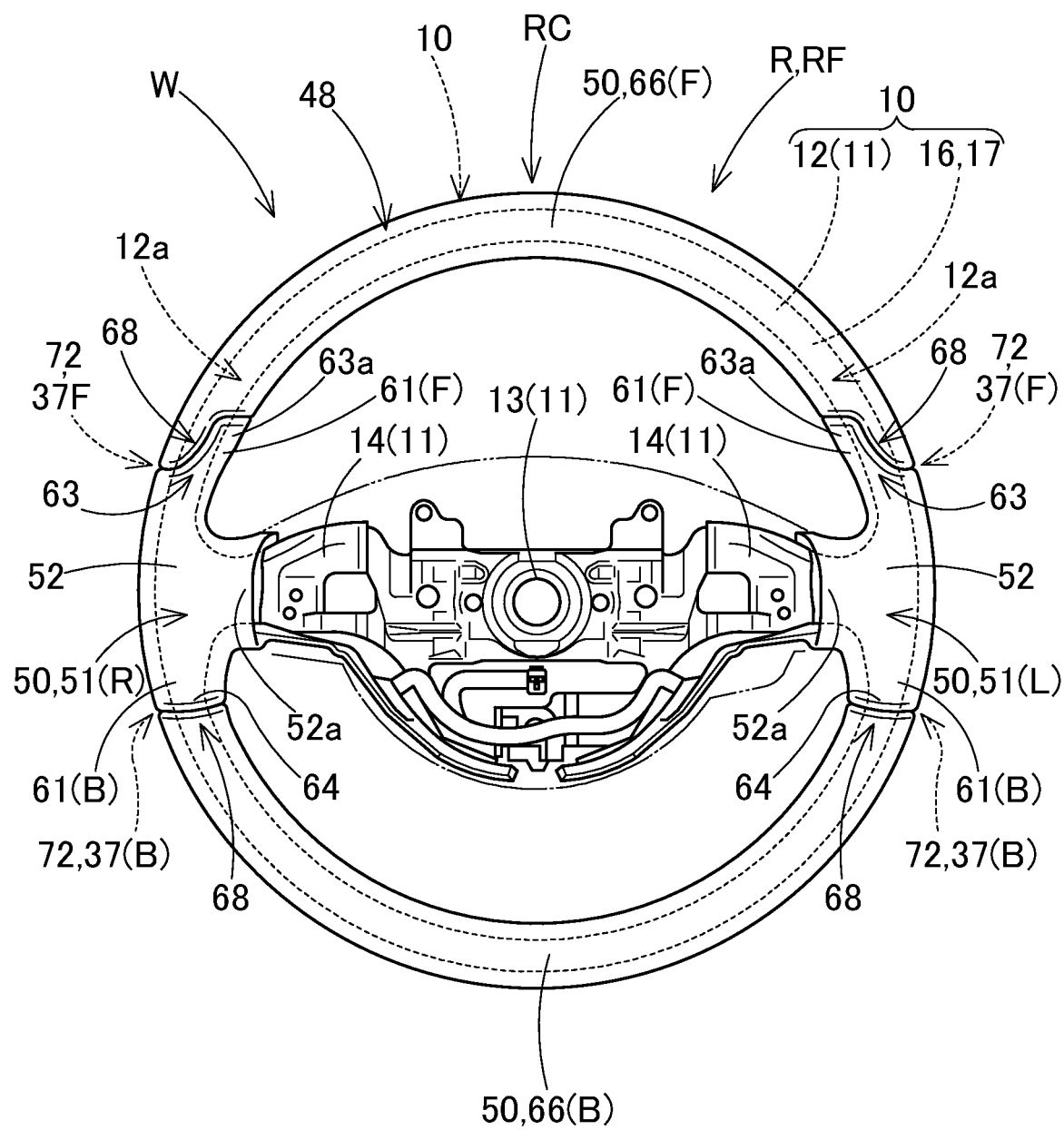
FIG. 3 is a bottom view of the steering wheel of FIG. 1.

As shown in FIGS. 1 to 3, a steering wheel W in accordance with an exemplary embodiment includes a generally annular rim R, which is for hand-holding for steering operation, a boss section B which is disposed at the center of the rim R, and one or more spokes S which interconnect the boss section B and the rim R. A pad 1 which is provided with an airbag device is to be mounted on the boss section B. The airbag device is not depicted in FIG. 1.

The steering wheel W includes a skeleton 11 which is formed from aluminum alloy or the like and disposed at the rim R, boss B, and spokes S. The skeleton 11 includes a rim-skeleton region 12 which is disposed at the rim R, a boss-skeleton region 13 which is disposed at the boss section S, and two spoke-skeleton regions 14 which are disposed at the spokes S.

The rim R is configured to bend downward when an impact is applied from above. Specifically, the rim-skeleton region 12 includes a bendable portion 12a each on the left and right sides, and the rim R (more particularly, a portion in a vicinity of the center RC in a left and right direction of a front region RF, see FIG. 3) is configured to bend downward about the bendable portions 12a.

Figure 12:
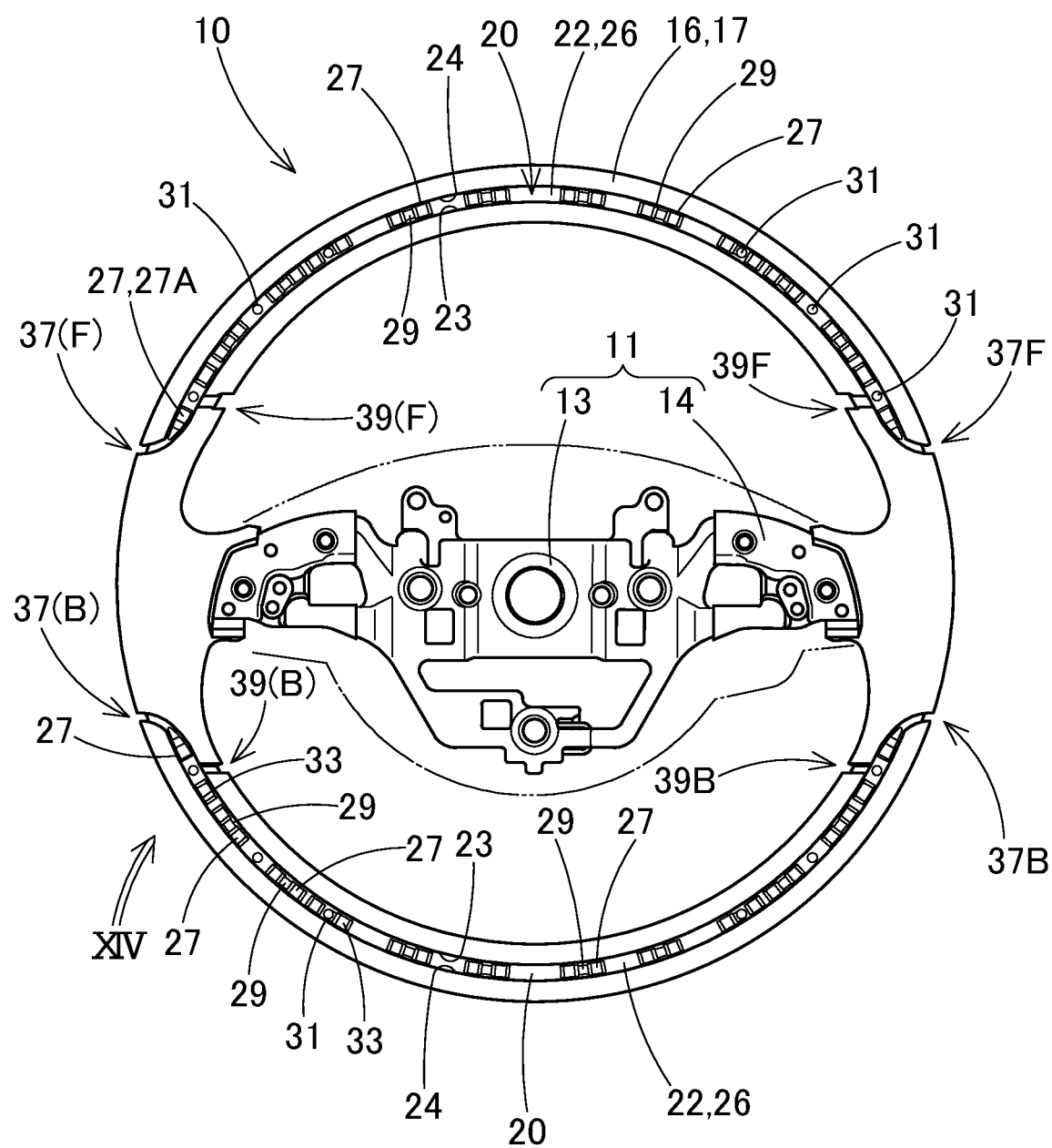
FIG. 12 is a schematic plan view of a steering wheel body from which the surface skin and the decorative components are removed.
Figure 13:
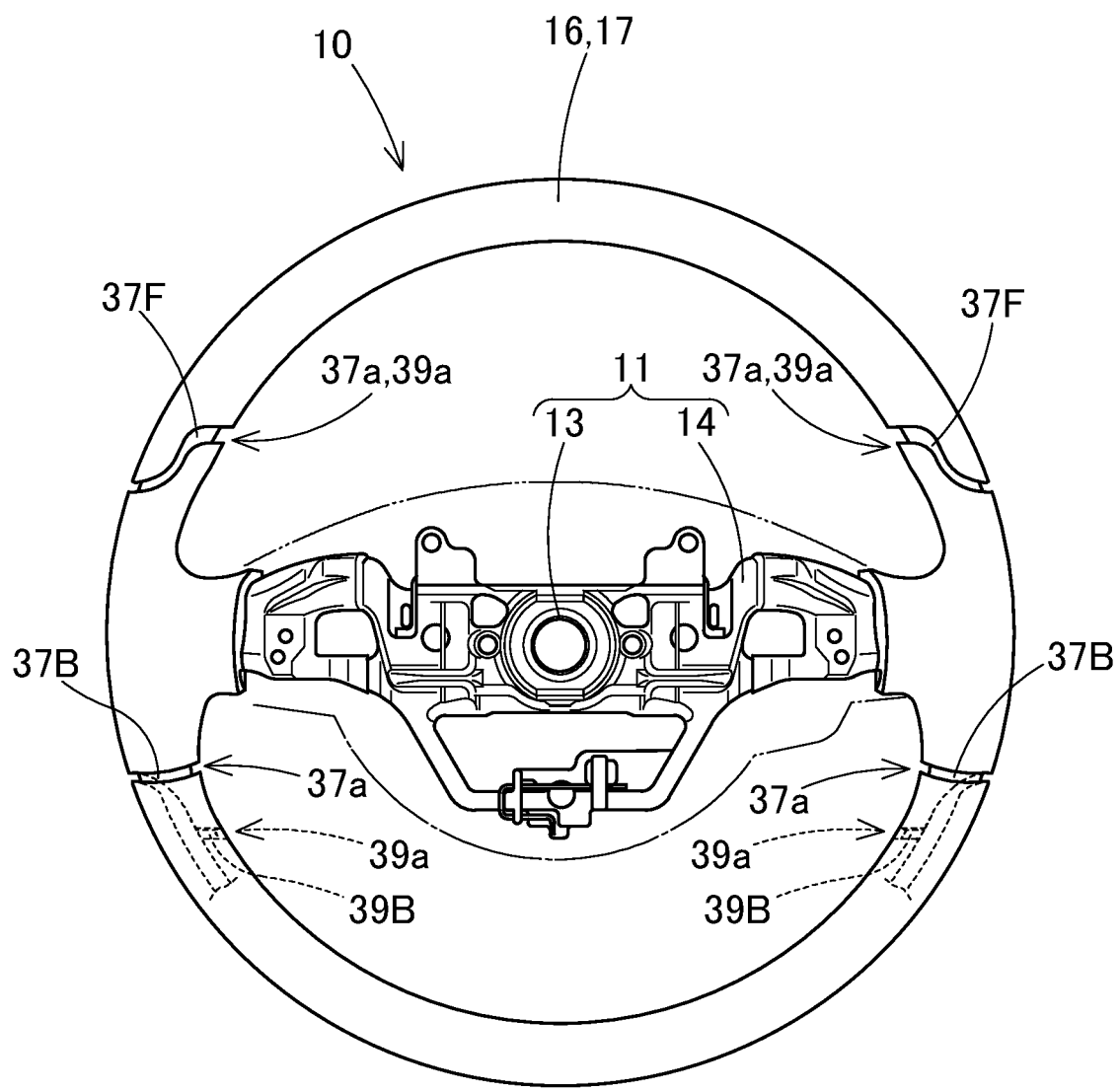
FIG. 13 is a schematic bottom view of the steering wheel body from which the surface skin and the decorative components are removed.

As can be seen in FIGS. 12 and 13, the skeleton 11 is covered with a cladding layer 17 on the rim-skeleton region 12 and a region of each of the spoke-skeleton regions 14 adjoining the rim-skeleton region 12. The cladding layer 17 is formed from synthetic resin such as urethane or the like, by way of example. A surface skin 50 which is composed of natural leather, artificial leather or the like, and a decorative component 85 which is fabricated from ABS resin or the like are mounted around the cladding layer 17. That is, as can be seen in FIGS. 1 and 3, the steering wheel W includes a wheel body 10 which includes the skeleton 11 and cladding layer 17, and a finishing section 48 which includes the surface skin 50 and the decorative component 85 and is mounted around the wheel body 10 for imparting a decorative effect to the rim R. The cladding layer 17 serves as a base 16 on which the finishing section 48 is mounted.

As can be seen in FIGS. 1 and 2, the decorative component 85 is formed into a band shape extending along the rim R, in other words, a generally half annular shape, and attached to an upper surface of the rim R, surrounded by the surface skin 50. In the illustrated embodiment, one each decorative component 85 (i.e. 85F, 85B) is disposed in a front region and a rear region of the rim R. The decorative components 85F and 85B are the same things. Each of the decorative components 85F and 85B extends towards the left and right from the center in a left and right direction of the rim R to short of intersections RL and RR of the rim R and left and right spokes S. Each of the decorative components 85F and 85B is located at a center of the upper surface of the rim R.

As can be seen in FIGS. 2 and 6 to 11, the decorative component 85 includes a left and a right leading-end portions 87 each of which has a tapered form, and a body 86 which is formed into a band shape curving along the rim R and has a uniform width through its length between the leading-end portions 87. The decorative component 85 further includes a decorative portion 90 on the upper side and a mounting base 92 on the lower side. The decorative portion 90 includes a flat decorative surface 90a, and the mounting base 92 is provided with a plurality of mounting projections 93 to be mounted on the base 16. The decorative portion 90 has a shape like a plate extending through an entire length of the decorative component 85. The mounting base 92 has a smaller width than the decorative portion 90 except at vicinities of the leading-end portions 87, and is disposed over an entire length of the lower side of the decorative component 85.

Each of the leading-end portions 87 of the decorative component 85 has such a shape that either one of the inner circumferential edge and outer circumferential edge curves towards an outer circumference or inner circumference of the rim R and intersects with the other. That is, each of the leading-end portions 87 has a curving edge 87a which curves towards the outer circumference or inner circumference and a non-curving edge 87b which curves along the curvature of the rim R. In the illustrated embodiment, the curving edge 87a continues from an inner circumferential edge (or inner edge) 86a of the body 86 of the decorative component 85 and the non-curving edge 87b continues from an outer circumferential edge (or outer edge) 86b of the body 86.

Figure 7:
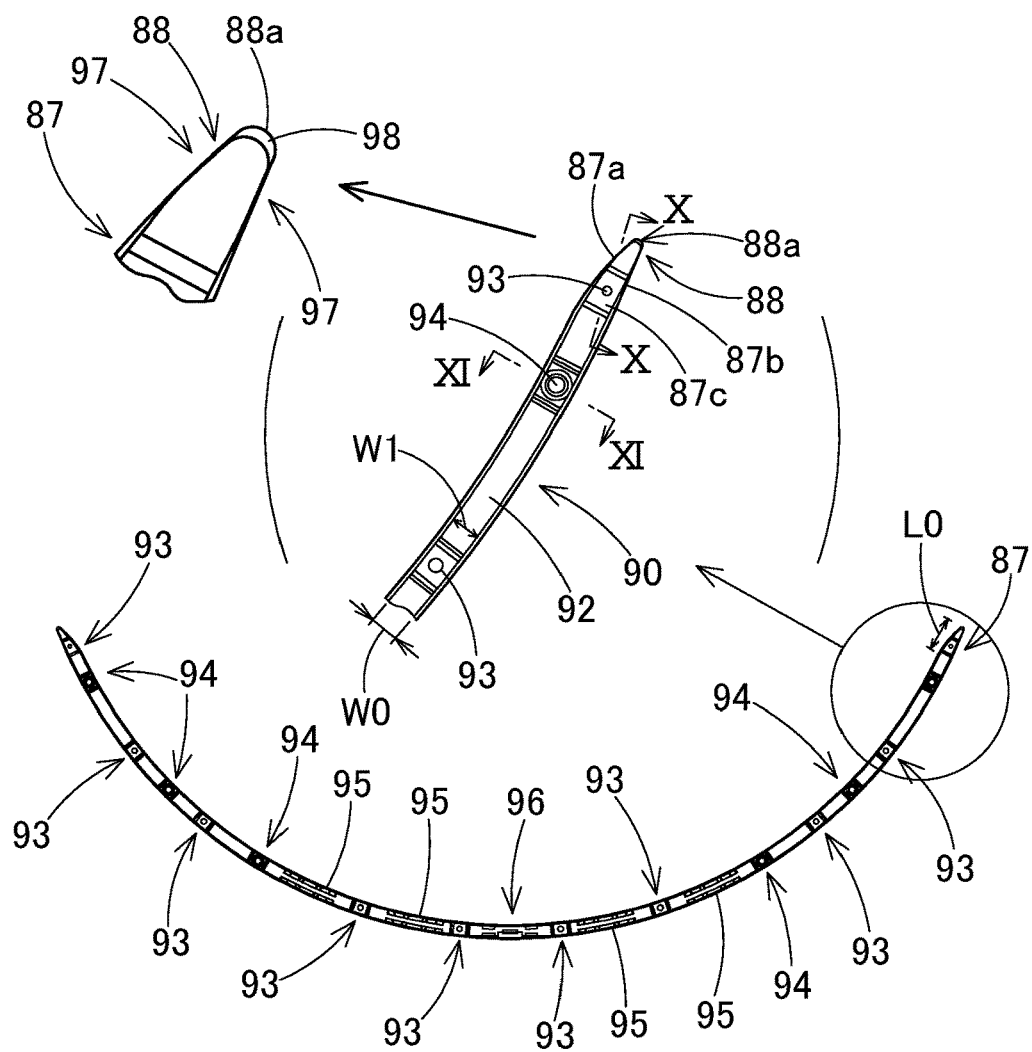
FIG. 7 is a bottom view of the decorative component of FIG. 6.
Figure 8:
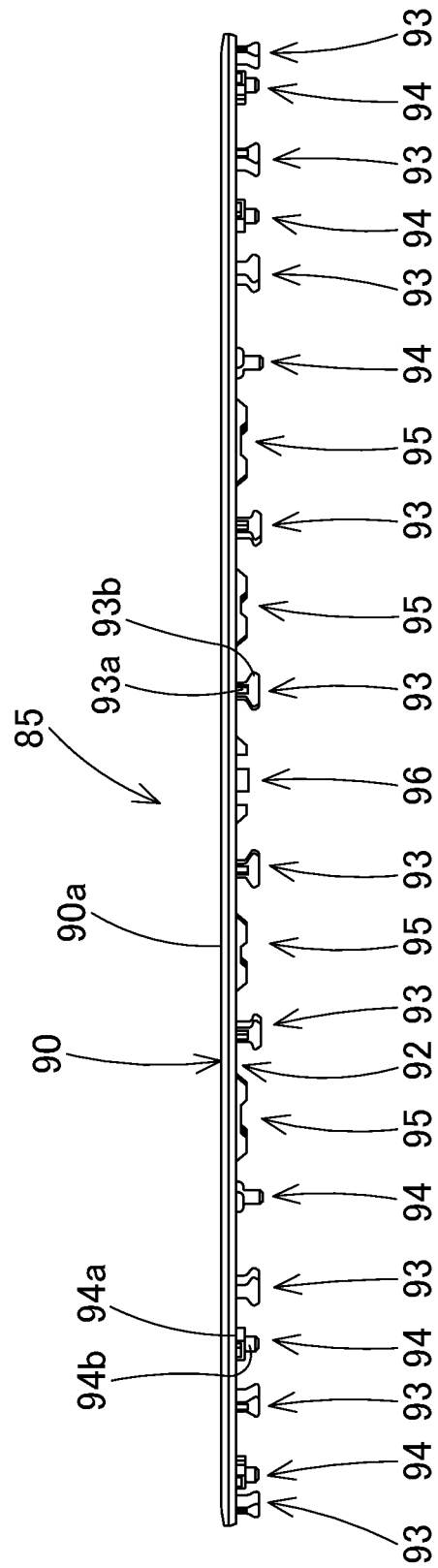
FIG. 8 is a front elevation of the decorative component of FIG. 6.
Figure 9:
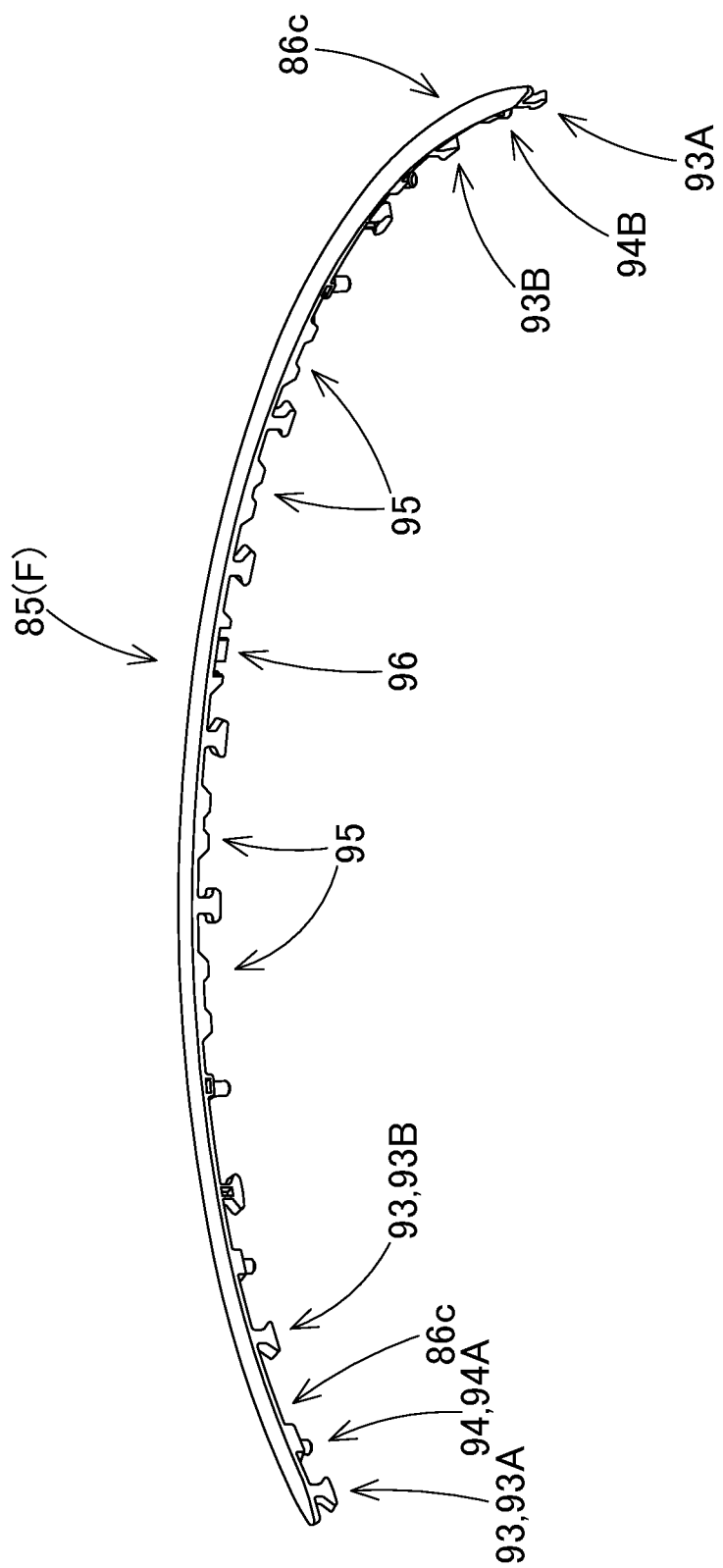
FIG. 9 is a schematic perspective view of the decorative component of FIG. 6.
Figure 10:
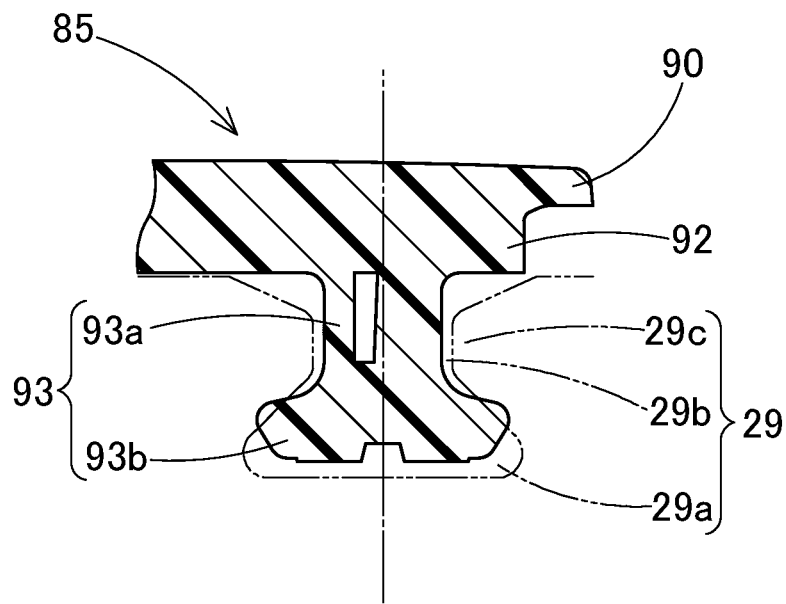
FIG. 10 is a schematic sectional view of the decorative component taken along line X-X of FIG. 7.
Figure 21:
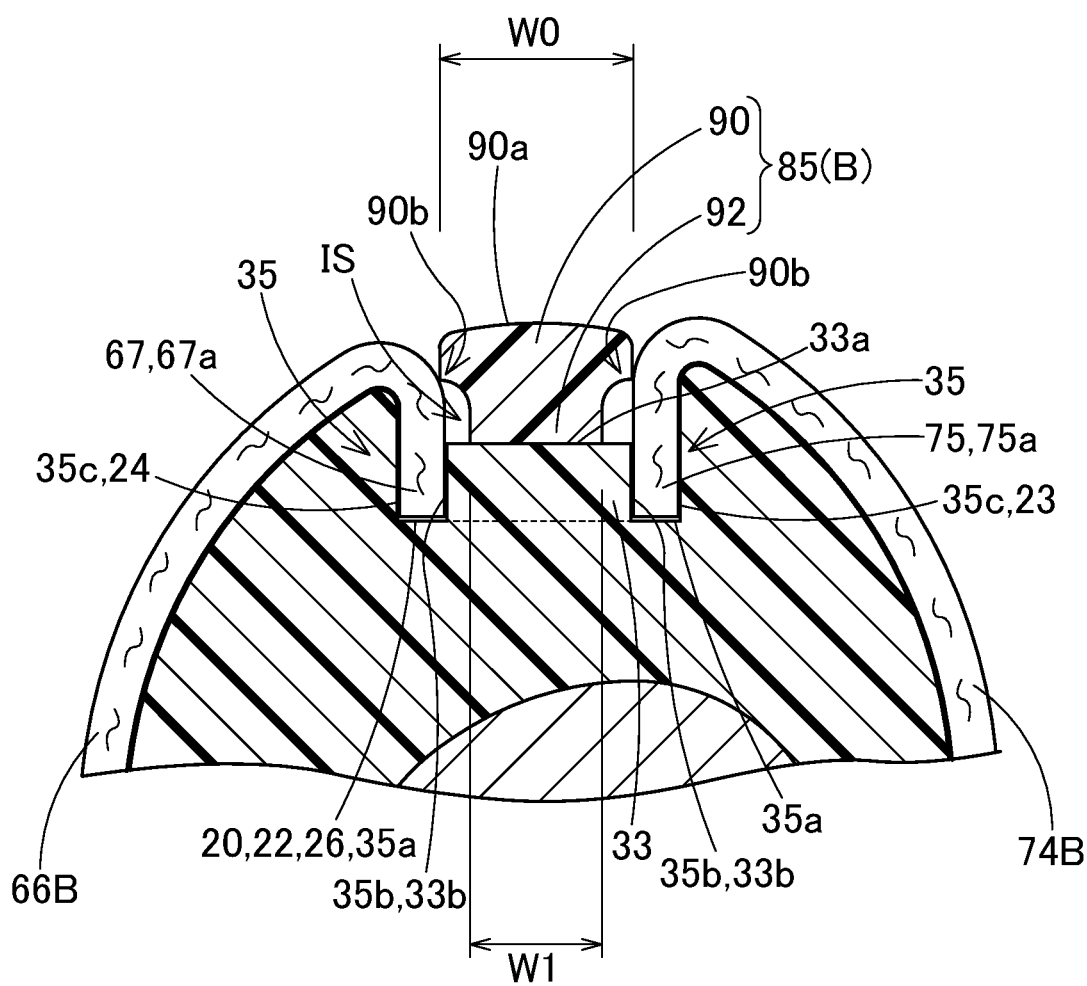
FIG. 21 is a sectional view of the steering wheel taken along line XXI-XXI of FIG. 14, which equals to a sectional view taken along line XXI-XXI of FIG. 2.

As shown in FIGS. 7 and 21, in the illustrated embodiment, the width W0 of the body 86 of the decorative component 85 (which equals to a width of the later-described decorative portion 90) is approximately 4.5 mm, the width W1 of the later-described mounting base 92 is approximately 3.5 mm, and the length L0 of each of the leading-end portions 87 is approximately 18 mm. An apex 88 of each of the leading-end portions 87 is rounded, and has an arc face 88a with a radius R0 of approximately 1.5 mm.

The mounting base 92 of the decorative component 85 includes a plurality of (ten, in the illustrated embodiment) mounting projections 93 which project downwardly and are used to mount the decorative component 85 on the base 16, a plurality of (six, in the illustrated embodiment) positioning projections 94 which project downwardly, and a plurality of supporting projections 95 and 96 which protrude downwardly. Each of the mounting projections 93 includes a neck 93a which projects from the mounting base 92, and a retaining leg 93b which is disposed at the lower end of the neck 93a and enlarges towards both directions along the rim R. One of the mounting projections 93 is also disposed at a root region 87c of each of the tapered leading-end portions 87 which is disposed proximate to the body 86. These will be called the mounting projections 93A.

Figure 11:
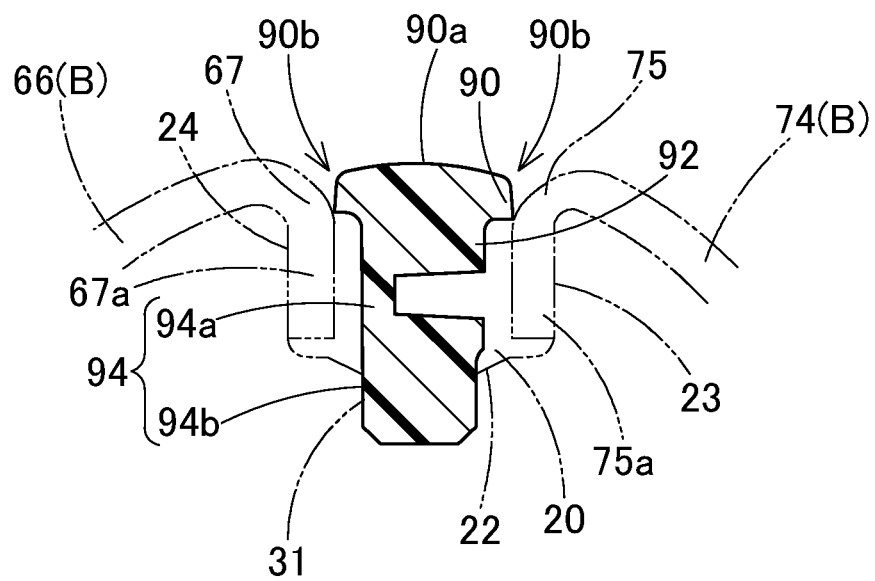
FIG. 11 is a schematic sectional view of the decorative component taken along line XI-XI of FIG. 7.

Each of the positioning projections 94 includes a root portion 94a which projects from the mounting base 92 in a rectangular plate shape, and a rod portion 94b which extends downwardly from the lower surface of the root portion 94a in a generally columnar shape, as shown in FIG. 11. The root portion 94a has, on a side, a recessed portion which helps reduce the volume.

Each of the first supporting projections 95 has such a shape that two trapezoidal plates are connected and line up in a length direction of the body 86. A set of two supporting projections 95 are disposed proximate to the inner circumferential edge 86a and proximate to the outer circumferential edge 86b of the body 86, respectively, each at two positions to the left and to the right of a central region in the left and right direction of the body 86. Five second supporting projections 96 are disposed in the central region in the left and right direction of the body 86. Each of the second supporting projections 96 is formed into an either triangular or rectangular thin plate. These supporting projections 95 and 96 are disposed in vicinities of the mounting projections 93 or positioning projections 94, abut against and are supported by a later-described general region 26 (bottom surface 22) of the base 16 such that the decorative surface 90a of the decorative portion 90 is arranged at such a level that does not protrude from the upper surface of the rim R as the mounting projections 93 and positioning projections 94 are inserted into later-described mounting holes 29 and insert holes 31 of the base 16.

Figure 18:
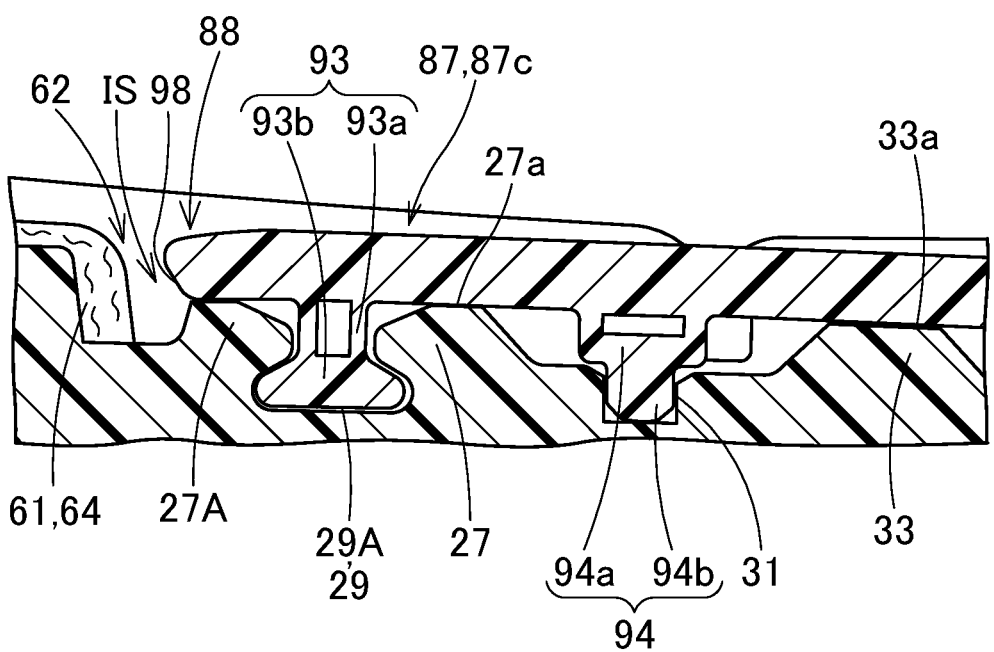
FIG. 18 is a sectional view of the steering wheel taken along line XVIII-XVIII of FIG. 2.
Figure 19:
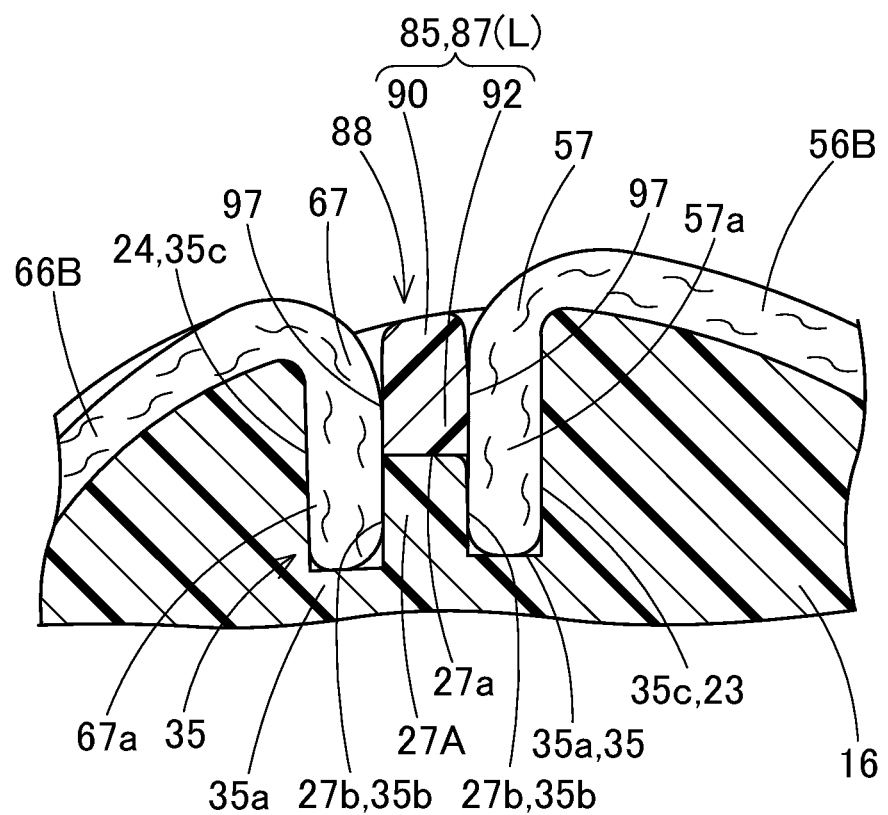
FIG. 19 is a sectional view of the steering wheel taken along line XIX-XIX of FIG. 2.

The decorative component 85 of the illustrated embodiment includes, in each of the leading-end portions 87, a flat surface 97 in which a side surface of the decorative portion 90 and a side surface of the mounting base 92 are generally flush, as can be seen in FIGS. 7 and 19. The flat surfaces 97 are disposed on both sides (i.e. on an inner circumferential side and an outer circumferential side) of each of the leading-end portions 87 of the decorative component 85. Both of the flat surfaces 97 (i.e. the flat surface 97 on the inner circumferential side and that on the outer circumferential side) continue to the arc face 88a of the apex 88 of the leading-end portion 87 in a merging fashion, and also continue to a leading-end curved surface 98 (FIGS. 7 and 18) in a merging fashion. The leading-end curved surface 98 is inclined downward and towards the root region 87c of the leading-end portion 87, as shown in FIG. 18.

Figure 24:
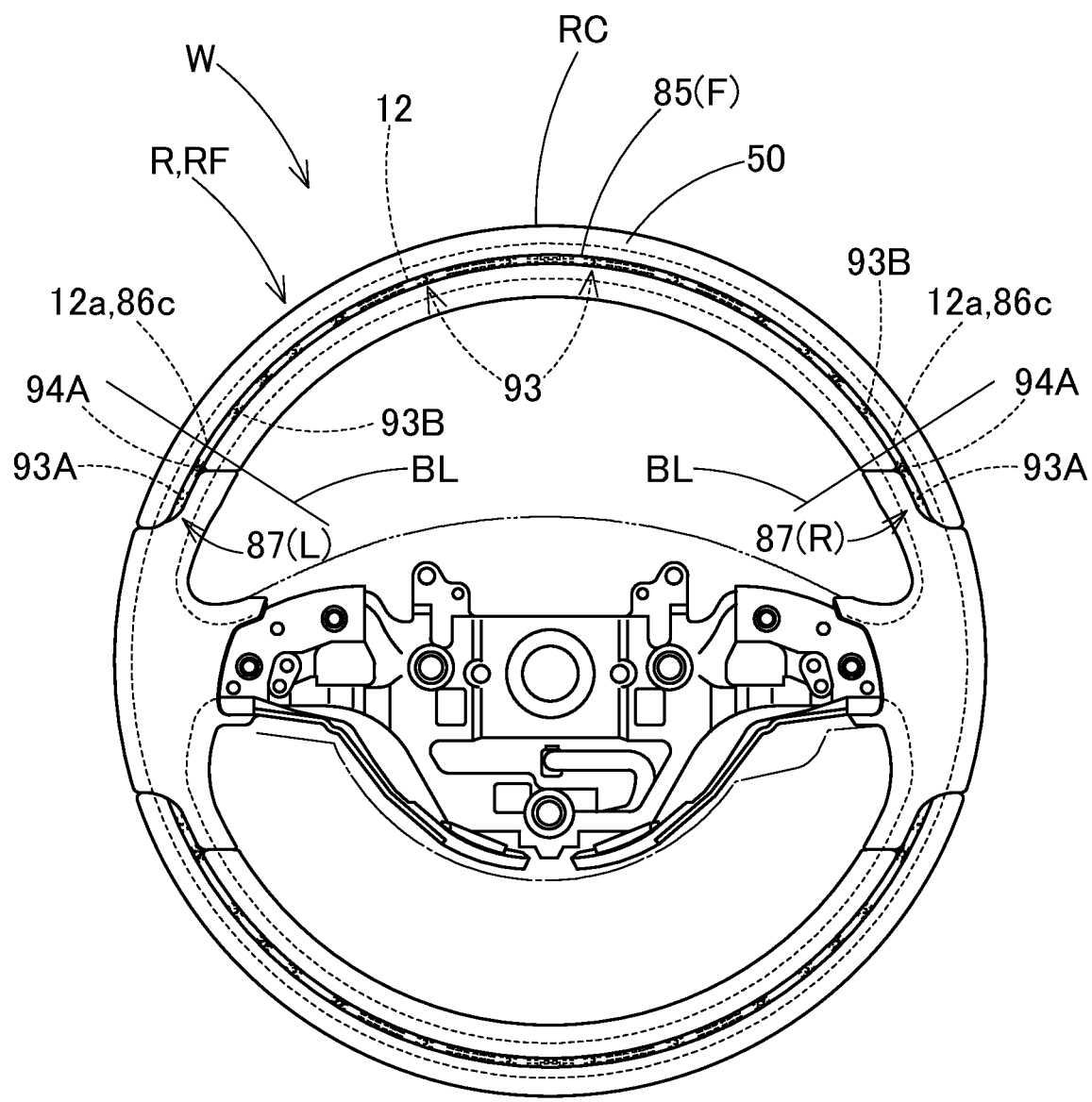
FIG. 24 is a schematic plan view of the steering wheel of the exemplary embodiment showing creases caused by deformation due to an impact.

In the decorative component 85F of the illustrated embodiment, the position of a mounting projection 93B which neighbors the mounting projection 93A disposed in the leading-end portion 87 is determined such that, when the decorative component 85F is mounted on the rim R, the bendable portion 12a of the rim-skeleton region 12 is positioned immediately under a generally halfway point 86c between the mounting projection 93A and the neighbor mounting projection 93B, as shown in FIG. 24, in each of the leading-end portions 87. Moreover, in the illustrated embodiment, a positioning projection 94A which is disposed between the mounting projection 93A and mounting projection 93B is disposed towards the leading-end portion 87 with respect to the generally halfway point 86c between the mounting projection 93A and the neighbor mounting projection 93B. That is, the positioning projection 94A is not located immediately above the bendable portion 12a.

Figure 5:
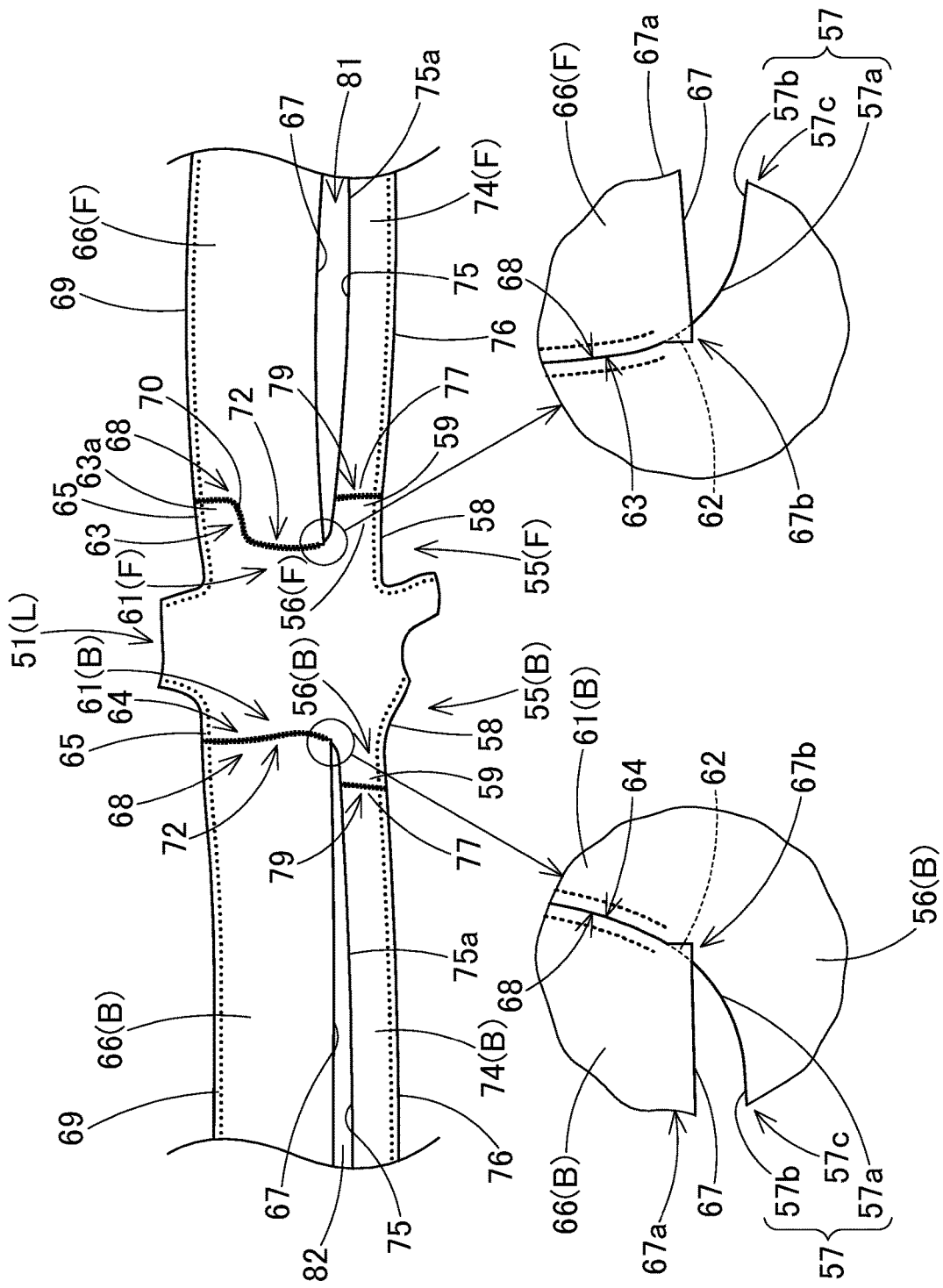
FIG. 5 is a plan view of the surface skin showing the way two non-curved-side cover sections and two adjoining cover sections are joined to a curved-side section.
Figure 6:
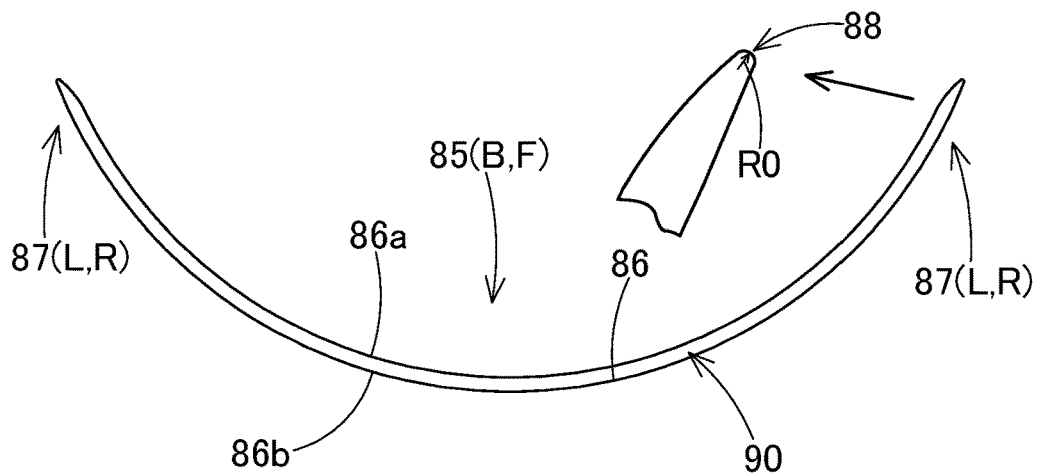
FIG. 6 is a plan view of the decorative component of the exemplary embodiment.
Figure 14:
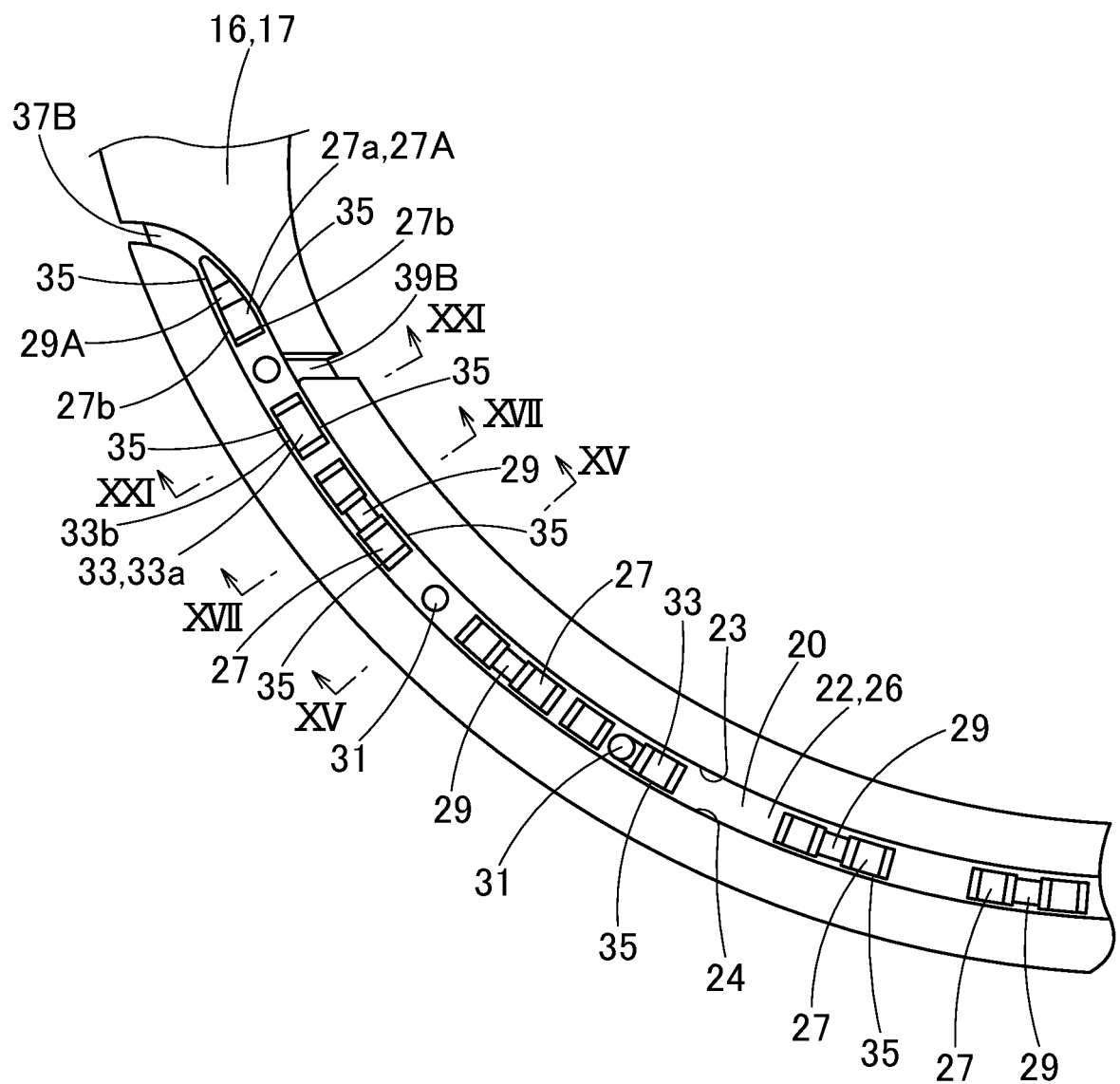
FIG. 14 is a partial enlarged plan view of a XIV portion of FIG. 12.
Figure 22:
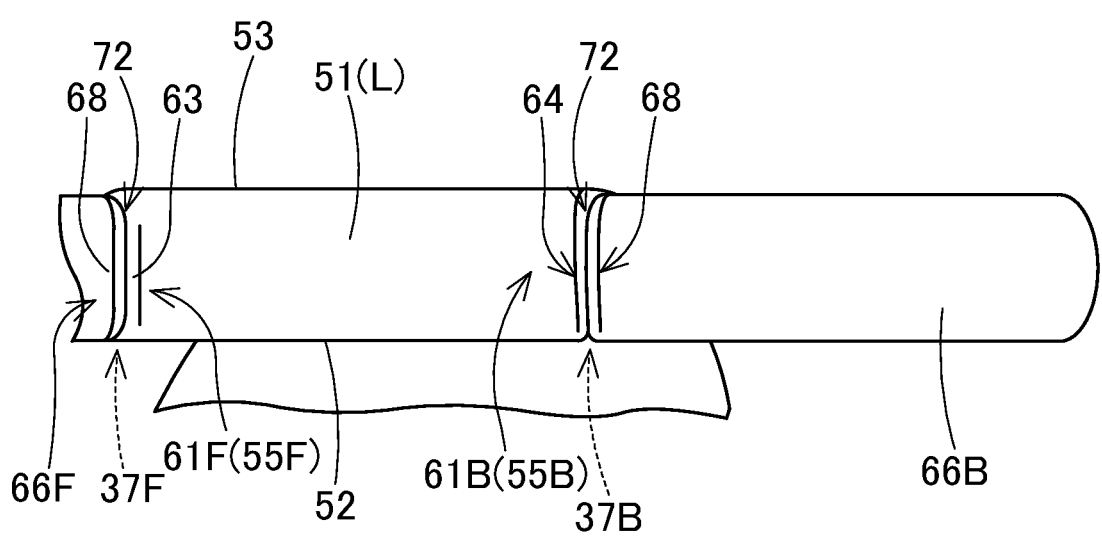
FIG. 22 is a partial side view of the steering wheel of the exemplary embodiment.
Figure 23:
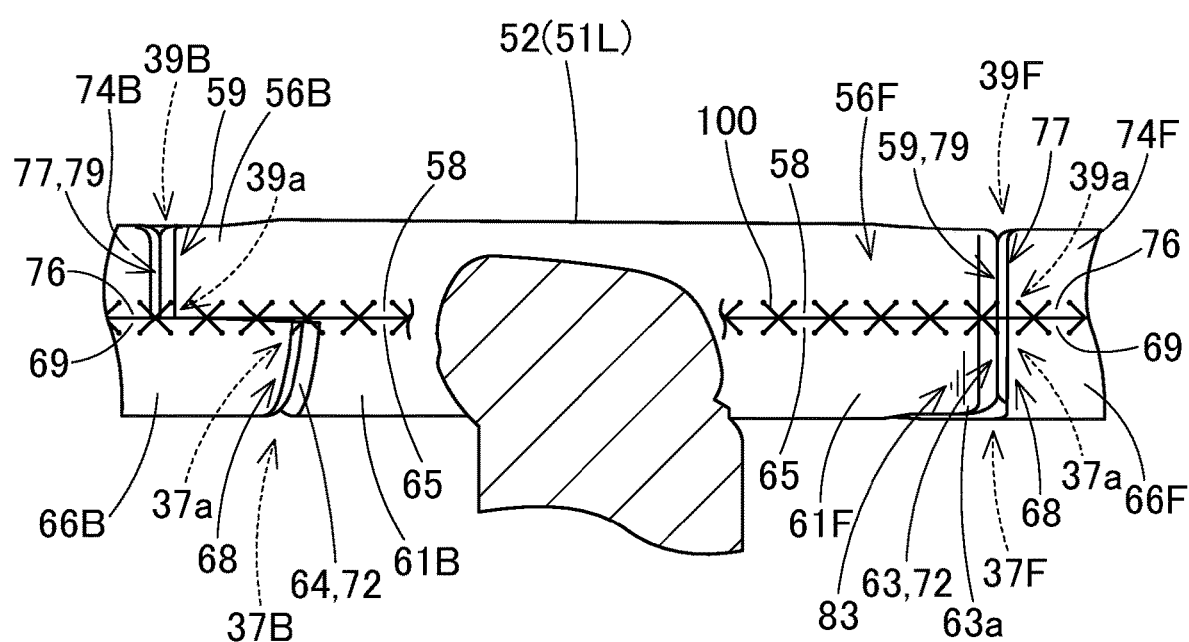
FIG. 23 schematically depicts an inner surface of a portion of a rim of the steering wheel in a vicinity of one of the spokes.

Referring to FIGS. 12 to 14, the base 16 of the rim R includes one each setting recess 20 in which the decorative component 85F/85B is set, in the front region and rear region. The base 16 further includes a plurality of positioning grooves 37 (37F, 37B) and 39 (39F, 39B) each of which extends from the setting recess 20 in a circumferential direction of a cross section of the rim R. Referring to FIGS. 5, 22 and 23, each of the positioning grooves 37F is to receive a seam 72 of a joint edge 63 of an extended portion 61F of a later-described curved-side cover section 55F and a joint edge 68 of a later-described non-curved-side cover section 66F. Each of the positioning grooves 37B is to receive a seam 72 of a joint edge 64 of an extended portion 61B of a later-described curved-side cover section 55B and a joint edge 68 of a later-described non-curved-side cover section 66B. Each of the positioning grooves 39F is to receive a seam 79 of a joint edge 59 of a main body 56F of the curved-side cover section 55F and a joint edge (or leading edge) 77 of a later-described adjoining cover section 74F, and each of the positioning grooves 39B is to receive a seam 79 of a joint edge 59 of a main body 56B of the curved-side cover section 55B and a joint edge (or leading edge) 77 of a later-described adjoining cover section 74B.

Figure 4:
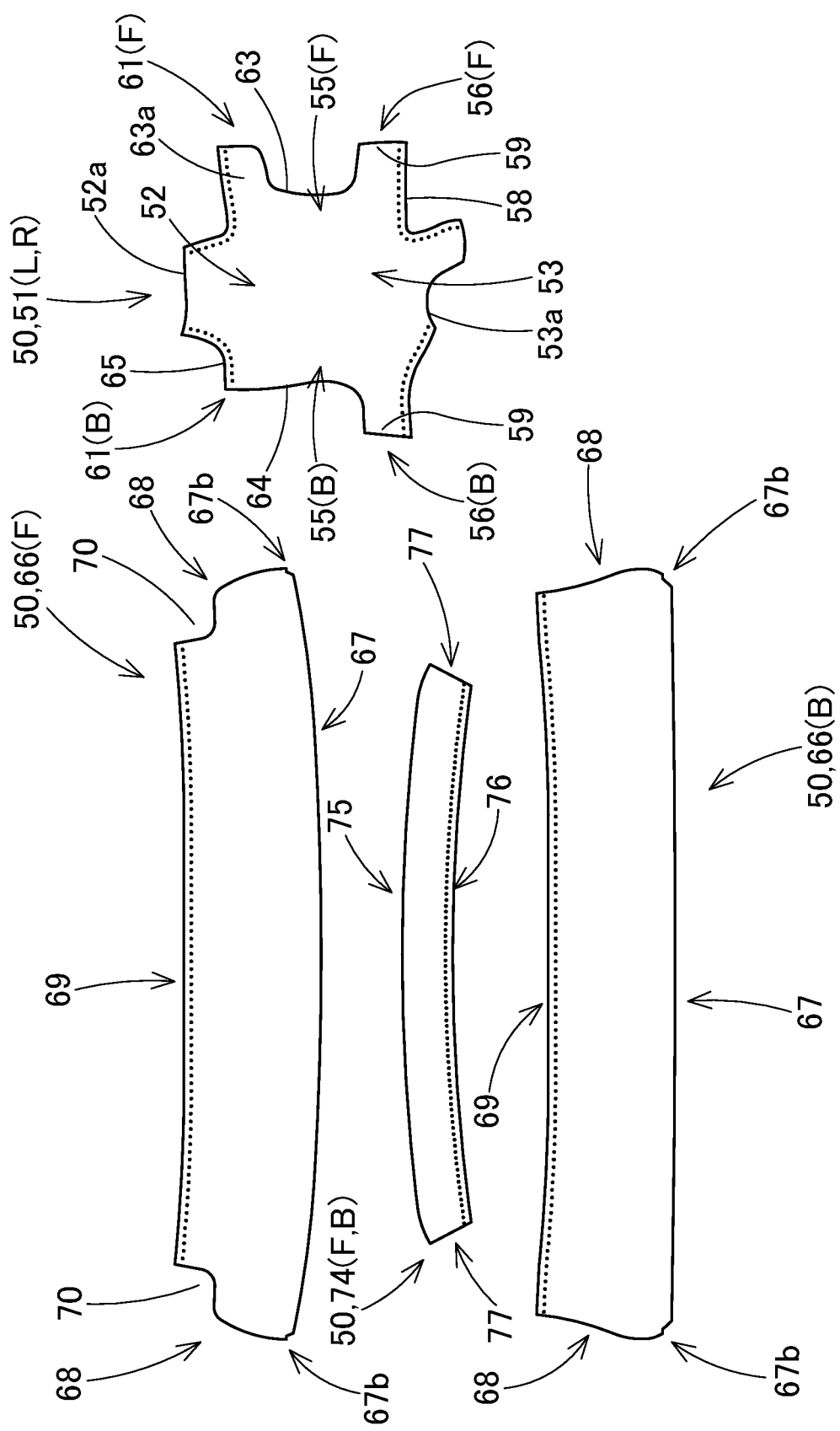
FIG. 4 depicts components of a surface skin in the exemplary embodiment in plan.

In the illustrated embodiment, as shown in FIG. 23, although terminals 37a and 39a of the positioning grooves 37F and 39F get together in the inner circumference of the rim R, on the part of the positioning grooves 37B and 39B, a terminal 37a of the positioning groove 37B is positioned farther to the front than a terminal 39a of the positioning groove 39B in the inner circumference of the rim R. In other words, the terminal 39a of the positioning groove 39B is located father to the rear than the terminal 37a of the positioning groove 37B. It is the reason for the difference that the joint edge 63 of the extended portion 61F of the curved-side cover section 55F is provided with a protruding portion 63a and the non-curved-side cover section 66F includes a recessed portion 70 corresponding to the protruding portion 63a, while the joint edge 64 of the extended portion 61B of the curved-side cover sections 55B does not include a protruding portion, as shown in FIGS. 4 and 5.

Figure 17:
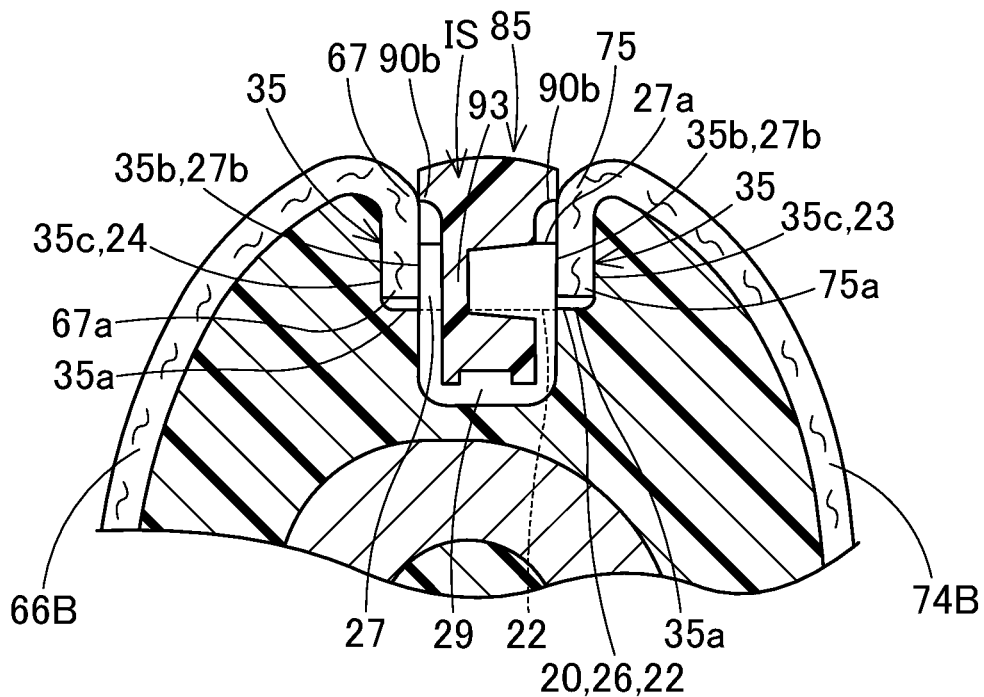
FIG. 17 is a sectional view of the steering wheel taken along line XVII-XVII of FIG. 14, which equals to a sectional view taken along line XVII-XVII of FIG. 2.

As shown in FIGS. 17 and 21, each of the setting recesses 20 includes a bottom surface 22 and a pair of upright surfaces 23 and 24 which extend upward from opposite edges in the width direction of the bottom surface 22. The bottom surface 22 includes a planar general region 26 and a predetermined number of seats 27 and raised portions 33 which protrude from the general region 26.

Figure 16:
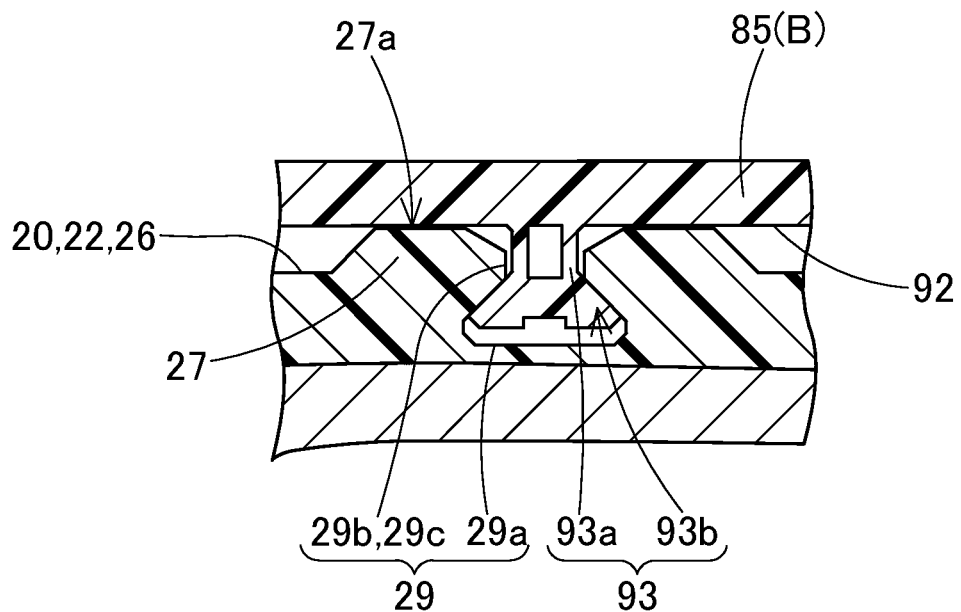
FIG. 16 is a sectional view of the steering wheel taken along line XVI-XVI of FIG. 2.

Each of the seats 27 is raised from the general region 26 generally in an isosceles trapezoidal shape as viewed from a side, as shown in FIG. 16. The seat 27 includes a mounting hole 29 which extends downward from the upper surface 27a for receiving the mounting projection 93 of the decorative component 85 and retaining the retaining leg 93b of the mounting projection 93. The mounting hole 29 includes a large hole portion 29a for storing the retaining leg 93b and a small hole portion 29b which is disposed on the large hole portion 29a and has a smaller opening area than the large hole portion 29a. A boundary region between the small hole portion 29b and large hole portion 29a serves as a retaining edge 29c which retains the retaining leg 93b of the mounting projection 93.

Figure 15:
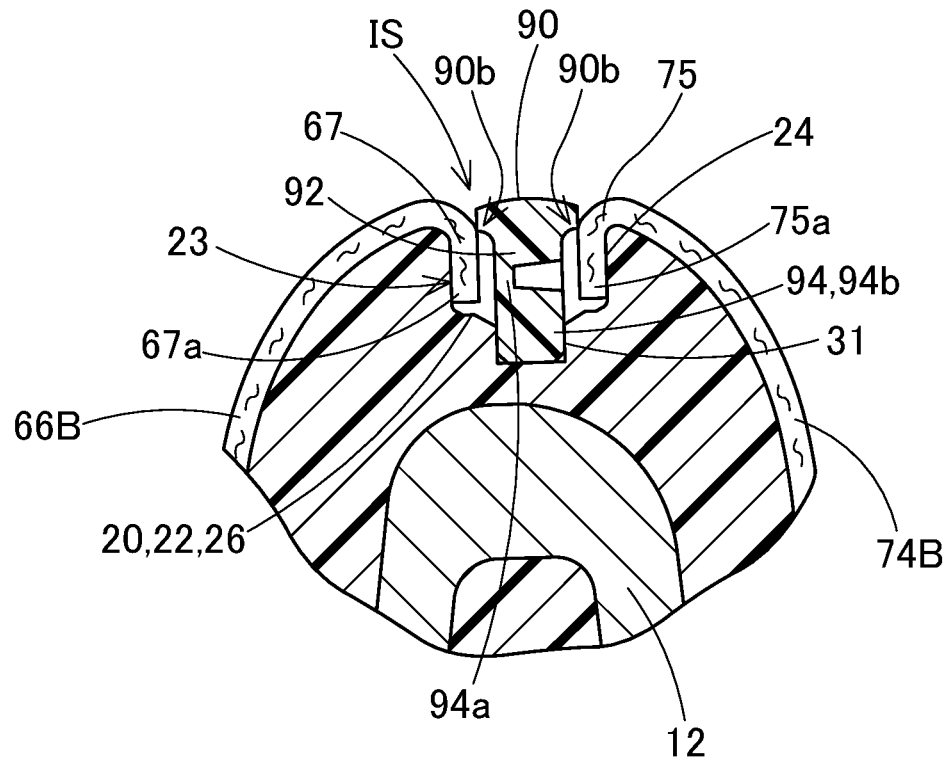
FIG. 15 is a sectional view of the steering wheel taken along line XV-XV of FIG. 14, which equals to a sectional view taken along line XV-XV of FIG. 2.

The general region 26 of the setting recess 20 is provided with a plurality of insert holes 31 for receiving the rod portions 94b of the positioning projections 94 of the decorative component 85 at positions corresponding to the positioning projections 94, as shown in FIG. 15.

Each of the raised portions 33 protrudes from the general region 26 in a generally trapezoidal shape as viewed from a side. Six raised portions 33 are provided in the illustrated embodiment.

Figure 20:
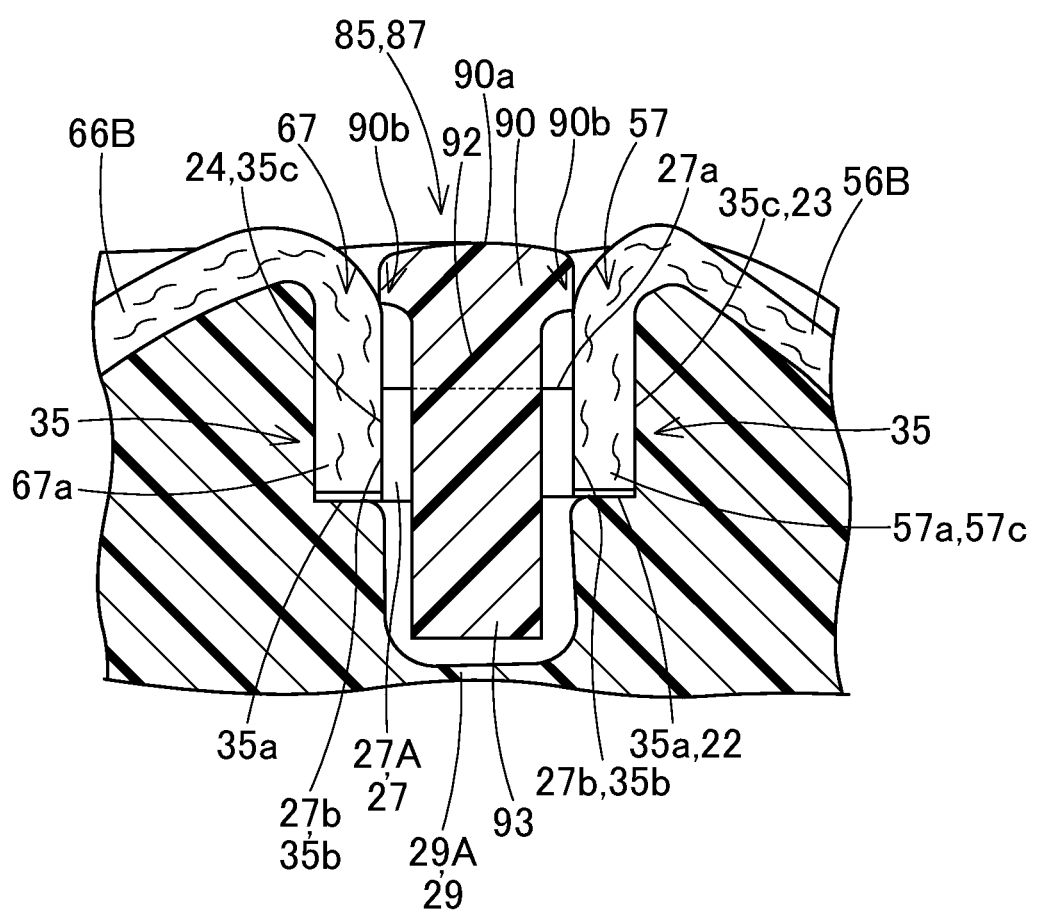
FIG. 20 is a sectional view of the steering wheel taken along line XX-XX of FIG. 2.

As can be seen in FIGS. 17, 20 and 21, opposite side surfaces of each of the seats 27 and raised portions 33 serve as vertical surfaces 27b, 33b which stand up from the general region 26 (i.e. bottom surface 22). The vertical surfaces 27b, 33b form, in cooperation with the upright surfaces 23, 24 of the setting recess 20, one each storing groove 35 on the inner and outer sides of the rim R, in which storing groove 35 a terminal (edges 57, 67 or 75, as described later) of the surface skin 50 is stowed or fitted. Each of the storing groove 35 includes a bottom surface 35a and a first and a second opposite upright surfaces 35b and 35c. The vertical surfaces 27b and 33b of the seats 27 and raised portions 33 form the first upright surface 35b, and the upright surface 23 or 24 forms the second upright surface 35c.

Especially, as shown in FIGS. 14 and 19, a terminal seat 27A, which is provided with a terminal mounting hole 29A for receiving the mounting projection 93A formed in the root region 87c of the tapered leading-end portions 87 (87L, 87R) of the decorative component 85 (85F, 85B), is so configured that the storing grooves 35 in the inner side and outer side of the rim R draw close to each other so as to correspond to the tapered form of the leading-end portion 87 (87L, 87R).

The upper surfaces 27a of the seats 27 and upper surfaces 33a of the raised portions 33 serve as supporting surfaces that supports lower surface of the mounting base 92 of the decorative component 85, as shown in FIGS. 16, 18 and 21.

Referring to FIGS. 1 to 5, the surface skin 50 is composed of four kinds of base members 51, 66F, 66B and 74. The member 51 includes two pieces serving as common sections 51L, 51R which are arranged in the intersections RL and RR of the rim R and left and right spokes S in a bilaterally symmetrical fashion. Each of the common sections 51L, 51R includes a lower-side portion 52 and an upper-side portion 53 that cover an outer circumference of the rim R and a lower side and an upper side of the intersections RL and RR in cooperation. A leading edge of each of the lower-side portion 52 and upper-side portion 53 serves as a spoke-side edge 52a, 53a which is joined to a lower or upper portion of an end surface of the cladding layer 17 in each of the left and right spokes S.

Since the common sections 51L, 51R are bilaterally symmetrical, the left common section 51L is described here. A front portion and a rear portion of the common section 51L respectively serve as curved-side cover sections 55F, 55B each of which is arranged in a vicinity of the leading-end portion 87L of the front/rear decorative component 85F/85R. Each of the curved-side cover sections 55F and 55B includes a main body 56 (56F, 56B) which is to adjoin the curving edge 87a of the leading-end portion 87L of each of the decorative components 85F and 85R, and an extended portion 61 (61F,61B) which extends from the main body 56 towards the spoke-side edge 52a. As described above, the extended portion 61F includes a protruding portion 63a in the edge (joint edge) 63.

The member 66B is a non-curved-side cover section 66B which is to adjoin the non-curving edge 87b of the leading-end portion 87 of the rear decorative component 85B. The non-curved-side cover section 66B includes an opposing edge 67 which is opposed to an opposing edge 57 (FIG. 5) of the main body 56B of the left curved-side cover section 55B across a slit 82 in which the decorative component 85B is set. The non-curved-side cover section 66B further includes, each in the opposite ends, a leading edge 68 which is joined with a joint edge 64 of the extended portion 61B of the curved-side cover section 55B.

The member 66F is a non-curved-side cover section 66F which is to adjoin the non-curving edge 87b of the leading-end portion 87 of the front decorative component 85F. The non-curved-side cover section 66F also includes, each in the opposite ends, a leading edge 68 which is joined with the joint edge 63 of the extended portion 61F of the curved-side cover section 55F. The non-curved-side cover section 66F has a similar configuration to that of the non-curved-side cover section 66B except in that each of the leading edges 68 includes a recessed portion 70 which corresponds to the protruding portion 63a of the joint edge 63 of the extended portion 61F.

Each of the non-curved-side cover sections 66B and 66F is provided, in regions of the opposing edge 67 proximate to the joint edges 63, 64, with one each bulging portion 67b which bulges in a triangular plate shape. The bulging portions 67b help mask the upright surfaces 35b and 35c of the storing grooves 35 in vicinities of the apexes 88 of the decorative components 85 when the opposing edge 67 is fitted in the storing groove 35.

The member 74 is an adjoining cover section 74 (74F, 74B) whose opposite joint edges 77 are joined to joint edges (or leading edges) 59 of the main bodies 56F or 56B of the curved-side cover sections 55F and 55B. Each of the adjoining cover sections 74F and 74B are disposed opposite to the non-curved-side cover sections 66F and 66B across the slit 81/82. An opposing edge 75 of each of the adjoining cover sections 74F and 74B adjoins the inner circumferential edge (or inner edge) 86a of the body 86 of the decorative component 85F/85B.

The front and rear curved-side cover sections 55F, 55B, the non-curved-side cover sections 66F, 66B, and adjoining cover sections 74F, 74B as described above are also arranged in the right side of the rim R. In the steering wheel W as a whole, a total of six members of the surface skin 50, i.e. two common sections 51L, 51R disposed bilaterally symmetrically, two adjoining cover sections 74F, 74B disposed symmetrically in the front and rear direction, one non-curved-side cover sections 66F and one non-curved-side cover section 66B, are used.

In the illustrated embodiment, in portions of the surface skin 50 adjoining the leading-end portions 87 of the decorative components 85, by way of example, in a vicinity of the left leading-end portion 87L of the decorative component 85B, as shown in FIGS. 2 and 5, the main body 56B of the curved-side cover sections 55B includes, in the opposing edge 57 opposed to the non-curved-side cover section 66B across the slit 82, a curving portion 57a that curves along the curving edge 87a of the leading-end portion 87L of the decorative component 85B and makes the main body 56B of the curved-side cover sections 55B fit the curving edge 87a of the leading-end portion 87L in shape. In the illustrated embodiment, the opposing edge 57 of the main body 56B of the curved-side cover section 55B includes a general portion 57b which is disposed away from the leading-end portion 87L and extends along the rim R (i.e. along the curvature of the body 86 of the decorative component 85) and the curving portion 57a which extends from the general portion 57b and curves towards the outer circumference of the rim R. The extended portion 61B extends from the main body 56B beyond the apex 88 of the leading-end portion 87L of the decorative component 85B, extends towards the non-curving edge 87b of the leading-end portion 87L, then is joined to the leading edge 68 of the non-curved-side cover section 66B. The extended portion 61B includes, in its edge proximate to the decorative component 85B, a curved edge 62 which curves continuously from the curving portion 57a of the main body 56B and is joined to the leading edge 68 of the non-curved-side cover section 66B, as shown in FIG. 5.

The curving portion 57a of the opposing edge 57 and the curved edge 62 are configured to fit the curvature of the curving edge 87a also in the right leading-end portion 87R of the decorative component 85B and in the left and right leading-end portions 87L and 87R of the front decorative component 85F.

The edges of the surface skin 50 forming the slits 81 and 82, i.e. the opposing edges 57 of the main bodies 56F, 56B of the curved-side cover sections 55F and 55B, the opposing edges 67 of the non-curved-side cover sections 66F and 66B, and opposing edges 75 of the adjoining cover sections 74F and 74B, serve as mounting allowances 57c, 67a, 75a, and are bent and fitted in the storing grooves 35 of the setting recesses 20 with the use of adhesive, thus fixed in the storing grooves 35. In edges of the surface skin 50 which do not form the slits 81 and 82, far-side edges 58, 76 of the main bodies 56F and 56B of the curved-side cover sections 55F and 55B and adjoining cover sections 74F and 74B, and far-side edges 65, 69 of the extended portions 61F and 61B of the curved-side cover sections 55F and 55B and non-curved-side cover sections 66F and 66B are joined together in the inner circumference of the rim R. Thus the surface skin 50 is mounted on the base 16, i.e. on the outer surface of the rim R.

The surface skin 50 is mounted on the rim R as follows, by way of example. The adjoining cover sections 74F and 74B are joined to the main bodies 56F and 56B of the curved-side cover sections 55F and 55B of the common section 51L by the joint edges 59 and 77. The non-curved-side cover sections 66F and 66B are joined to the extended portions 61F and 61B of the curved-side cover sections 55F and 55B by the joint edges 63 and 68 or by the joint edges 64 and 68. Likewise, in the common section 51R, the adjoining cover sections 74F and 74B are joined to the main bodies 56F and 56B of the curved-side cover sections 55F and 55B by the joint edges 59 and 77, and the non-curved-side cover sections 66F and 66B are joined to the extended portions 61F and 61B of the curved-side cover sections 55F and 55B by the joint edges 63 and 68 or by the joint edges 64 and 68. Thus the surface skin 50 is formed into an annular shape. Then the mounting allowances 57c, 67a, 75a of the curved-side cover sections 55, non-curved-side cover sections 66 and adjoining cover sections 74 including the curved edges 62 of the curved-side cover sections 55, and the seams 72 and 79 are fitted in the storing grooves 35 and positioning grooves 37, 39 with the use of adhesive. Then the far-side edges 58, 76 of the main bodies 56 of the curved-side cover sections 55 and adjoining cover sections 74, and the far-side edges 65, 69 of the extended portions 61 of the curved-side cover sections 55 and non-curved-side cover sections 66 are adhered to the inner circumference of the rim R and sewn together with sewing threads 100 by whipstitch as shown in FIG. 23. Thus the surface skin 50 is mounted on the base 16 of the rim R.

After the surface skin 50 was mounted on the base 16, the rear decorative component 85B is set in a setting space IS, i.e. in the slit 82 surrounded by the non-curved-side cover section 66B, adjoining cover section 74B and curved-side cover sections 55B of the common sections 51L and 51R, by inserting the mounting projections 93 and positioning projections 94 into the mounting holes 29 and insert holes 31 in the setting recess 20 in the base 16. Thus the rear decorative component 85B is mounted on the base 16, i.e. on the rim R. Likewise, the front decorative component 85F is set in another setting space IS, i.e. in the slit 81 surrounded by the non-curved-side cover section 66F, adjoining cover section 74F and curved-side cover sections 55F of the common sections 51L and 51R, by inserting the mounting projections 93 and positioning projections 94 into the mounting holes 29 and insert holes 31 in the setting recess 20 in the base 16. Thus the front decorative component 85F is mounted on the base 16, i.e. on the rim R.

With the steering wheel W provided with the decorative component 85, as shown in FIGS. 2 and 5, the main body 56 of the curved-side cover section 55, which is disposed in the circumference of the tapered leading-end portion 87 of the decorative component 85, includes the curving portion 57a which corresponds to the curving edge 87a of the leading-end portion 87 in shape, and the extended portion 61 of the curved-side cover section 55 is disposed to extend beyond the apex 88 of the leading-end portion 87 of the decorative component 85. On the side of the non-curving edge 87b of the decorative component 85, the non-curved-side cover section 66 extends along the non-curving edge 87b of the leading-end portion 87. In other words, in the illustrated embodiment, the curved-side cover section 55 of the surface skin 50 is configured such that the curving portion 57a of the main body 56 is shaped to the curving edge 87a of the leading-end portion 87 of the decorative component 85 and the extended portion 61 continuing from the main body 56 is disposed beyond the apex 88 of the decorative component 85 and joined to the leading edge 68 of the non-curved-side cover section 66, in a vicinity of the apex 88 of the leading-end portion 87 where a gap would otherwise be likely to be formed. With this configuration, the curving edge 87a of the leading-end portion 87 in the vicinity of the apex 88, where a gap would otherwise be likely to be formed, is surrounded by the main body 56 shaped to the curving edge 87a and the extended portion 61 of the curved-side cover section 55 of the surface skin 50, and the apex 88 of the leading-end portion 76 abuts against a boundary area between the main body 56 and extended portion 61 of the curved-side cover section 55. That is, the configuration of the illustrated embodiment prevents a gap from being formed in the curving edge 87a of the leading-end portion 87 in the vicinity of the apex 88. A gap is prevented from forming also on the side of the non-curving edge 87b of the decorative component 85, since the non-curved-side cover section 66 extends along the non-curving edge 87b, and the joint edge 68 disposed in the leading edge of the non-curved-side cover section 66 is joined to the joint edge 64 of the extended portion 61 of the curved-side cover section 55 (the joint edge 68 of the non-curved-side cover section 66F is joined to the joint edge 63 of the extended portion 61F). As a consequence, the decorative component 85 of the illustrated embodiment is disposed in the steering wheel W with little fear that a gap is formed between the leading-end portion 87 and surface skin 50 (particularly, the curved-side cover section 55 and non-curved-side cover section 66).

Therefore, despite the configuration that the band-shaped decorative component 85 having the tapered leading-end portion 87 is disposed on the upper surface of the rim R, surrounded by the surface skin 50 (55, 66), the steering wheel W of the illustrated embodiment has little fear that a gap is formed between the decorative component 85 and the surface skin 50 (55, 66), thus has a good appearance in the rim R.

In the steering wheel W of the illustrated embodiment, as shown in FIG. 5, the extended portion 61 of the curved-side cover section 55 includes, in its edge proximate to the decorative component 85, the curved edge 62 that curves continuously from the curving portion 57a of the main body 56 and is joined to the joint edge 68 of the non-curved-side cover section 66.

With this configuration, in the vicinity of the apex 88 of the leading-end portion 87 of the decorative component 85, the extended portion 61 having the curved edge 62 that curves continuously from the curving portion 57a of the main body 56 extends beyond the apex 88 of the decorative component 85 and is joined to the joint ledge 68 of the non-curved-side cover section 66. That is, the curving portion 57a and curved edge 62 of the curved-side cover section 55 and the opposing edge 67 of the non-curved-side cover section 66 are disposed in as much proximity to the decorative component 85 as possible in the vicinity of the apex 88 of the leading-end portion 87 where the curving edge 87a and non-curving edge 87b intersect each other. Therefore, it is further prevented that a gap is formed between the decorative component 85 and the surrounding surface skin 50 (55, 66).

In the steering wheel W of the illustrated embodiment, the rim R includes the base 16 on which the surface skin 50 and the decorative component 85 are mounted, and the curved-side cover section 55 and the non-curved-side cover section 66 of the surface skin 50 are arranged on the base 16 in such a manner as to form the setting space IS in which the decorative component 85 is fitted. The decorative component 85 includes a plurality of mounting projections 93 on the underside, and each of the mounting projections 93 is inserted into and retained by a mounting hole 29 formed in the setting space IS of the base 16, as shown in FIGS. 17, 18 and 20.

With this configuration, the decorative component 85 can be easily mounted in the setting space IS disposed between the curved-side cover section 55 and the non-curved-side cover section 66 which have been mounted on the base 16 in advance by inserting the mounting projections 93 into the mounting holes 29, with no fear of uplifting of the decorative component 85.

Further, in the steering wheel W of the illustrated embodiment, one of the mounting projections 93 is disposed in the root region 87c of the leading-end portion 87 of the decorative component 85, as shown in FIGS. 2, 18 and 20.

That is, the tapered leading-end portion 87 of the decorative component 85 is mounted on the setting space IS of the base 16 with the mounting projection 93 which is located at the root region 87c having a great width. With this configuration, the mounting projection 93 in the leading-end portion 87 can be made as large as possible in width so as to secure a rigidity for enhancing the mounting strength, such that an uplifting of the decorative component 85, especially an uplifting of the leading-end portion 87, is steadily prevented.

In the steering wheel W of the illustrated embodiment, moreover, the setting space IS includes the general region 26 and at least one seat 27 that is raised from the general region 26. A terminal mounting hole 29A, which is one of the mounting holes 29 and receives the mounting projection 93 disposed in the root region 87c of the leading-end portion 87 of the decorative component 85, is formed in the seat 27A of the at least one seats 27. As shown in FIG. 20, the seat 27A includes one each vertical surface 27b in both of the side surfaces facing towards the inner circumference and outer circumference of the rim R. Each of the vertical surfaces 27b extends generally in the up and down direction. The base 16 further includes the two storing grooves 35 in each of which the mounting allowance 57c of the edge 57 of the curved-side cover section 55 and the mounting allowance 67a of the edge 67 of the non-curved-side cover section 66, which edges 57 and 67 are opposed to each other across the slit 81/82, are fitted. Each of the storing grooves 35 includes the first and second opposite upright surfaces 35b and 35c, as shown in FIGS. 14, 17 and 20. In each of the storing grooves 35, the vertical surface 27b of the seat 27A constitutes either one of the upright surfaces 35b, 35c of the storing groove 35.

With the above configuration, since the opposing edges 57 and 67 of the curved-side cover section 55 and the non-curved-side cover section 66 are each fitted and fixed in the storing grooves 35, there is little fear that the curved-side cover section 55 and the non-curved-side cover section 66 peel from the edges 57 and 67. Especially, in the vicinity of the leading-end portion 87 of the decorative component 85, either one of the upright surfaces 35b, 35c of each of the storing grooves 35 is constituted by the vertical wall 27b of the seat 27A provided with the mounting hole 29A for retaining the mounting projection 93. Accordingly, the opposing edges 57 and 67 of the curved-side cover section 55 and the non-curved-side cover section 66 are mounted on the base 16 with little fear of peeling in the vicinity of the leading-end portion 87 as well, thus the appearance of the surface skin 50 in the vicinity of the leading-end portion 87 of the decorative component 85 is kept good.

Further, in the steering wheel W of the illustrated embodiment, the decorative component 35 includes the decorative portion 90 on the upper side and the mounting base 92 which is disposed on the lower side and mounted on the base 16, and the decorative portion 90 has a greater width than the mounting base 92 except in the leading-end portions 87, as shown in FIGS. 7 and 21.

When the decorative component 85 is set in the setting space IS formed between the curved-side cover section 55 and the non-curved-side cover section 66 which have been mounted on the base 16 in advance, this configuration will allow the decorative component 85 to be mounted on the base 16 by bringing the opposite edges 90b in the width direction of the wide decorative portion 90 into contact with the curved-side cover section 55 and the non-curved-side cover section 66 while keeping the thin mounting base 92 away from the curved-side cover section 55 and the non-curved-side cover section 66. That is, this configuration facilitates the mounting of the decorative component 85 on the base 16, and prevents a gap from being formed between the decorative component 85 and the surrounding surface skin 50 (i.e. the curved-side cover section 55 and the non-curved-side cover section 66).

In the illustrated embodiment, especially, as shown in FIGS. 7 and 19, in the leading-end portion 87 of the decorative component 85, the side surface of the decorative portion 90 and the side surface of the mounting base 92 are generally flush, thereby forming the flat surface 97 around the leading-end portion 87.

Since the side surfaces of the decorative portion 90 and mounting base 92 are generally flush and form the flat surface 97 in the leading-end portion 87 of the decorative component 85, the edges 57 and 67 of the curved-side cover section 55 and the non-curved-side cover section 66 are brought into contact with the flat surface 97 of the decorative component 85 over a wide area when fitted in the setting space IS, and a frictional resistance will further prevent the leading-end portion 87 of the decorative component 85 from uplifting.

In the steering wheel W of the illustrated embodiment, furthermore, the rim R includes the bendable portion 12a that is configured to bend when an impact is applied from above such that a region of the rim R subjected to the impact bend downward. The bendable portion 12a is disposed, in an area where the decorative component 85 is disposed, at a position dislocated from the leading-end portion 87 of the decorative component 85 and proximate to the leading-end portion 87, as shown in FIG. 24. The decorative component 85 is disposed over the bendable portion 12a, and two mounting projections 93A and 93B of the plurality of mounting projections 93 are disposed such that one is disposed towards the leading-end portion 87 with respect to the bendable portion 12a and the other away from the leading-end portion 87 with respect to the bendable portion 12a.

With this configuration, even when an impact is applied to the rim R such that the bendable portion 12a bends and the region in the vicinity of the center RC of the front region RF of the rim R moves downward about the bendable portion 12a, since the mounting projections 93A and 93B of the decorative component 85 are located on both sides of the bendable portion 12*a* and stay retained in the mounting holes 29, the decorative component 85 will be deformed at the position of the bendable portion 12*a*, such that the decorative component 85 will be prevented from being disengaged from the rim R when an impact is applied to the rim R.

Especially in the illustrated embodiment, as shown in FIG. 24, the decorative component 85 includes a plurality of the positioning projections 94 that are inserted into the corresponding insert holes 31 formed in the base 16 and position the decorative component 85. One positioning projection 94A of the plurality of the positioning projections 94 is disposed between the two mounting projections 93A and 93B one of which is disposed towards the leading-end portion 87 and the other of which away from the leading-end portion 87, each with respect to the bendable portion 12*a*, and the positioning projection 94A is positioned dislocated from the bendable portion 12*a* and dislocated from the halfway point (or position) 86*c* between the two mounting projections 93A and 93B.

As described above, the mounting projections 93A and 93B disposed on both sides of the bendable portion 12*a* prevent the decorative component 85 from being disengaged from the rim R when an impact is applied to the rim R and the rim R bends downward about the bendable portion 12*a*. In addition, although the decorative component 85 is provided with the positioning projection 94A having a great sectional area and rigidity, the positioning projection 94A is positioned dislocated from the bendable portion 12*a* and dislocated from the halfway point (or position) 86*c* between the two mounting projections 93A and 93B. This configuration will allow the decorative component 85 to be deformed smoothly at the halfway position 86*c* between the mounting projections 93A and 93B one of which is disposed towards the leading-end portion 87 and the other of which away from the leading-end portion 87 each with respect to the bendable portion 12*a*, and prevent the decorative component 85 from being disengaged from the rim R in a steady fashion when the rim R is subjected to an impact. Of course, the positioning projections 94 help insert the mounting projections 93 into the mounting holes 29 by being inserted into the insert holes 31 in the base 16, thus facilitate the mounting of the decorative component 85 on the rim R.

In the steering wheel W of the illustrated embodiment, furthermore, on the side of the curving edge 87*a* of the leading-end portion 87 of the decorative component 85, there are disposed the cover-side cover section 55 and the adjoining cover section 74, respectively of the surface skin 50. The adjoining cover section 74 adjoins the main body 56 of the curved-side cover section 55 and is opposed to the non-curved-side cover section 66 across the slit 81/82. The leading edge 77 of the adjoining cover section 74 is located at a position proximate to and dislocated from the leading end-portion 87 of the decorative component 85 and joined with the corresponding edge 59 of the main body 56 of the curved-side cover section 55. The seam 79 of the leading edge 77 of the adjoining cover section 74 and the corresponding edge 59 of the curved-side cover section 55 are fitted in the positioning groove 39 formed in the base 16 of the rim R, as shown in FIGS. 2, 5 and 12.

With this configuration, since the seam 79 of the curved-side cover section 55 and adjoining cover section 74 is fitted and positioned in the positioning groove 39 of the base 16 at a position proximate to and dislocated from the leading-end portion 87 of the decorative component 85, the curved-side cover section 55 is arranged in a predetermined position proximate the leading-end portion 87 of the decorative component 85 with little fear of peeling, including the opposing edge 57 disposed opposite the curving edge 87*a* of the leading-end portion 87. That is, this configuration will help improve the appearance of the curved-side cover section 55 disposed adjacent the leading-end portion 87 of the decorative component 85.

Further, as shown in FIGS. 5 and 23, a set of the far-side edges 58, 76 of the main bodies 56 (56F, 56B) of the curved-side cover sections 55 (55F, 55B) and adjoining cover sections 74 (74F, 74B) and a set of the far-side edges 65, 69 of the extended portions 61 (61F, 61B) of the curved-side cover sections 55 (55F, 55B) and non-curved-side cover sections 66 (66F, 66B) are joined together in the inner circumference of the rim R. The far-side edges 58, 76, 65, 69 are distant from the slits 81, 82. Thus the decorative component 85, the curved-side cover sections 55 (55F, 55B), the non-curved-side cover sections 66 (66F, 66B), and the adjoining cover sections 74 (74F, 74B) cover the upper surface of the base 16 in the circumferential direction of the cross section of the rim R.

In the illustrated embodiment, moreover, the seam 79 of the leading edge 77 of the adjoining cover section 74B and the edge 59 of the main body 56B of the curved-side cover section 55B is dislocated from the seam 72 of the joint edge 64 of the extended portion 61B of the curved-side cover section 55B and the joint edge 68 of the non-curved-side cover section 66B in a direction extending along the rim R.

With this configuration, in a vicinity of the extended portion 61B of the rear curved-side cover section 55B, as shown in FIG. 23, it is not likely that wrinkles are formed in the inner circumference of the rim R in a vicinity of the seam 72 of the joint edge 64 of the extended portion 61B of the curved-side cover section 55 and the joint edge 68 of the non-curved-side cover section 66B because the seam 72 is dislocated and distant from the seam 79 in the direction extending along the rim R, thus the rim R will have a good appearance.

In contrast, in the front curved-side cover section 55F, the seam 79 of the leading edge 77 of the adjoining cover section 74F and the edge 59 of the main body 56F of the curved-side cover section 55F is located at the same position in the direction extending along the rim R as the seam 72 of the joint edge 63 of the extended portion 61F of the curved-side cover section 55F and the joint edge 68 of the non-curved-side cover section 66F. This configuration would be likely to form wrinkles 83 (FIG. 23) in the surface skin 50 in a vicinity of the seam 72 in the inner circumference of the rim R and adversely affect the appearance of the rim R.

Figure 25:
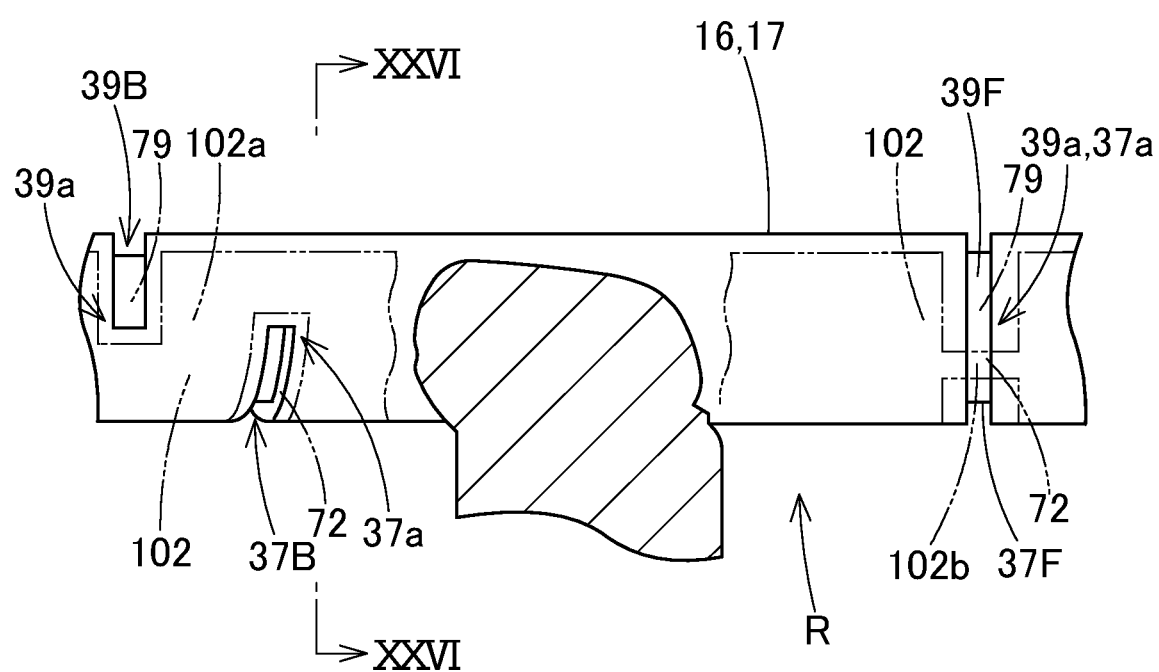
FIG. 25 schematically depicts an inner surface of a portion of the rim of the steering wheel in a vicinity of one of the spokes, in an instance where a heater element is mounted on a base of the rim.
Figure 26:
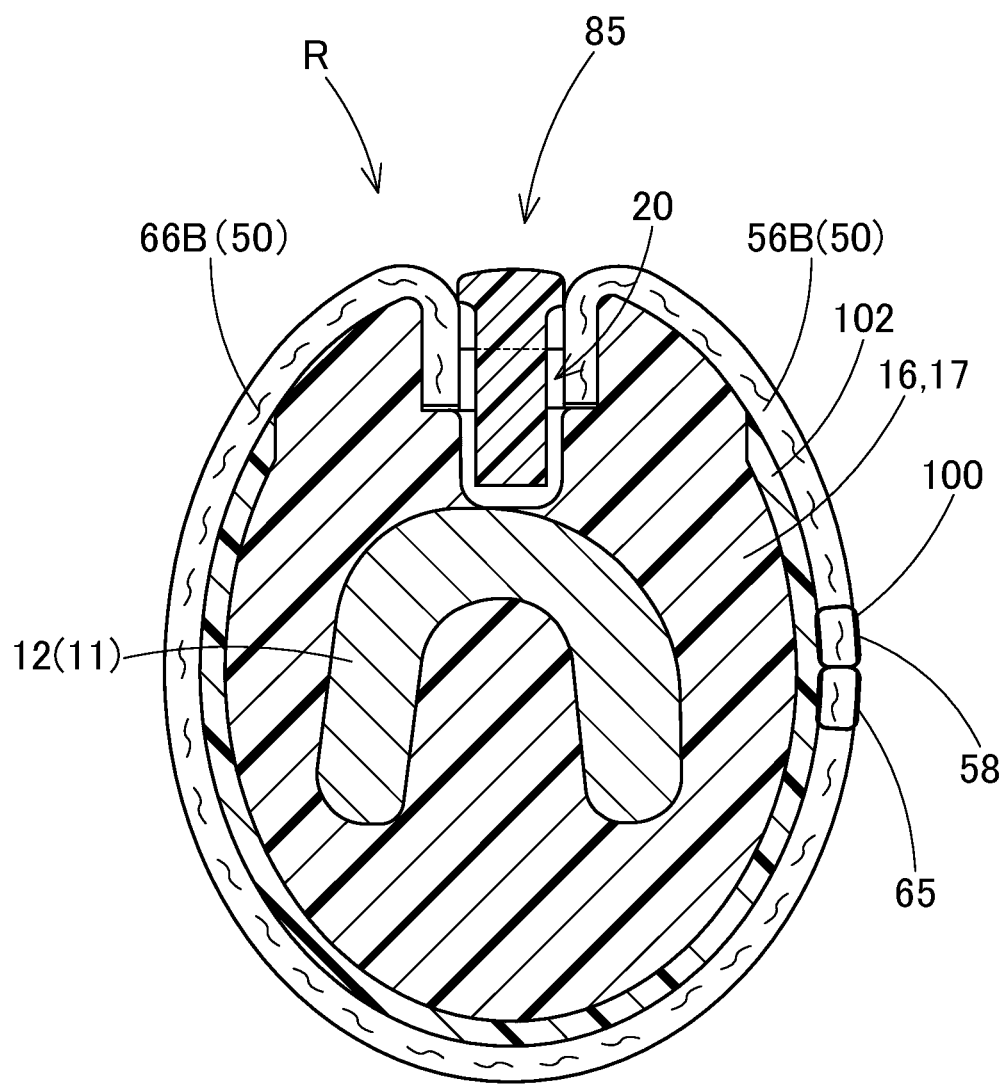
FIG. 26 is a cross section taken along line XXVI-XXVI of FIG. 25, which corresponds to the cutting position of FIG. 20, showing the way the heater element is disposed between the base of the rim and the surface skin.

Moreover, the configuration that the seam 79 and seam 72 are dislocated from each other may work to advantage for mounting of a heater element 102 for heating the rim R on the rim R, specifically between the base 16 (or cladding layer 17) and surface skin 50, as shown in FIGS. 25 and 26. That is, as shown in FIGS. 2, 5, 23 and 25, if the seam 79 of the leading edge 77 of the adjoining cover section 74B and the edge 59 of the main body 56B of the curved-side cover section 55B is dislocated from the seam 72 of the joint edge 64 of the extended portion 61B of the curved-side cover section 55B and the joint edge 68 of the non-curved-side cover section 66B in the direction extending along the rim R, the inner terminal 39*a* of the positioning groove 39B for receiving the seam 79 of the joint edge 59 of the main body 56B of the curved-side cover section 55B and the joint edge 77 of the adjoining cover section 74B and the inner terminal 37*a* of the positioning groove 37B for receiving the seam 72 of the joint edge 64 of the extended portion 61B of the curved-side cover section 55B and the joint edge 68 of the non-curved-side cover section 66B are dislocated from each other in the inner circumference of the rim R. This configuration enables a wiring part 102a of the heater element 102 to be arranged between the positioning grooves 39B and 37B, that is, the wiring part 102a does not have to be arranged across the positioning grooves 39B and 37B, such that the rim R can be provided with the heater element 102 while keeping a good appearance, with no need to increase the sectional diameter of the rim R. In contrast, if the inner terminal 39a of the positioning groove 39F for receiving the seam 79 of the joint edge 59 of the main body 56F of the curved-side cover section 55F and the joint edge 77 of the adjoining cover section 74F and the inner terminal 37a of the positioning groove 37F for receiving the seam 72 of the joint edge 63 of the extended portion 61F of the curved-side cover section 55F and the joint edge 68 of the non-curved-side cover section 66F are located at the same position in the inner circumference of the rim R as depicted on the right sides of FIGS. 5, 23 and 25, the wiring part 102b of a heater element 102 would have to be arranged across the positioning groove 37F. Since a placing of the wiring part 102b in the positioning groove 37F in addition to the joint 72 will form a bulge or the like and adversely affect the appearance of the rim R, some measures such as increase of the sectional diameter of the rim R will have to be taken, and that will make it difficult for the heater element 102 to be mounted.

If it is demanded that a heater element 102 is actually mounted in the steering wheel W of the illustrated embodiment, the front positioning grooves 39F and 37F and front cover sections 55F, 66F and 74F forming the seams 72 and 79 may be configured in the same way as the rear positioning grooves 39B, 37B and rear cover sections 55B, 66B, and 74B with no protruding portion 63a or recessed portion 70. That way the heater element 102 can be arranged on the rim R while keeping a good appearance of the whole steering wheel W.

The decorative components 85 in the illustrated embodiment is each configured such that the leading-end portion 87 curves towards the outer circumference of the rim R. However, the leading-end portion may alternatively be configured to curve towards the inner circumference of the rim R if the base 16 and the surface skin 50 are modified accordingly.

The steering wheel W may be provided with only one or more than two decorative components 85.

What is claimed is:

1. A steering wheel adapted to be mounted on a vehicle, comprising:
   a rim that is generally annular in shape and adapted to be hand-held for steering;
   at least one decorative component that is mounted on an upper surface of the rim, the decorative component being formed into a band shape extending along the rim;
   at least one leading-end portion of the decorative component that has a tapered form, the leading-end portion including a first and a second circumferential edges one disposed towards an inner circumference of the rim while the other towards an outer circumference of the rim, wherein the first circumferential edge curves towards and intersects with the second circumferential edge and forms an apex of the tapered form, thus the first circumferential edge constitutes a curving edge while the second circumferential edge constitutes a non-curving edge that curves along the rim; and
   a surface skin that is disposed on the upper surface of the rim and surround the decorative component, the surface skin including a curved-side cover section disposed adjacent the curving edge of the leading-end portion of the decorative component, and a non-curved-side cover section disposed adjacent the non-curving edge of the leading-end portion of the decorative component, a slit being formed between the curved-side cover section and the non-curved-side cover section such that the decorative component is set therein,
   wherein the curved-side cover section includes:
   a main body that includes a curving portion which is disposed adjacent the curving edge of the leading-end portion of the decorative component and corresponds to the curving edge of the leading-end portion in shape; and
   an extended portion that extends from the main body beyond the apex of the leading-end portion of the decorative component and further extends towards the non-curving edge of the leading-end portion of the decorative component, and
   wherein the non-curved-side cover section includes, at a leading end thereof apart from the apex of the leading-end portion of the decorative component, a joint edge that is joined with an edge of the extended portion of the curved-side cover section.

2. The steering wheel of claim 1, wherein the extended portion of the curved-side cover section includes, in an edge thereof proximate to the decorative component, a curved edge that curves continuously from the curving portion of the main body and is joined to the joint edge of the non-curved-side cover section.

3. The steering wheel of claim 1, wherein:
   the rim includes a base on which the surface skin and the decorative component are mounted;
   the curved-side cover section and the non-curved-side cover section of the surface skin are arranged on the base in such a manner as to form a setting space in which the decorative component is fitted;
   the decorative component includes a plurality of mounting projections in an underside thereof; and
   each of the mounting projections of the decorative component is inserted into and retained by a mounting hole formed in the setting space of the base.

4. The steering wheel of claim 3, wherein one of the mounting projections is disposed in a root region of the leading-end portion of the decorative component.

5. The steering wheel of claim 4, wherein:
   the setting space includes a general region and at least one seat that is raised from the general region;
   a terminal mounting hole, which is one of the mounting holes and receives the mounting projection disposed in the root region of the leading-end portion of the decorative component, is formed in the seat;
   the seat provided with the terminal mounting hole includes one each vertical surface in both of side surfaces facing towards the inner circumference and outer circumference of the rim, each of the vertical surfaces extending generally in an up and down direction;
   the base further includes two storing grooves in each of which an edge of the curved-side cover section and an edge of the non-curved-side cover section of the surface skin, which edges are opposed to each other across the slit, are fitted, each of the storing grooves including a first and a second opposite upright surfaces; and in each of the two storing grooves, the vertical surface of the seat constitutes either one of the first and the second upright surfaces of the storing groove.

6. The steering wheel of claim 3, wherein:
the rim includes a bendable portion that is configured to bend when an impact is applied from above such that a region of the rim subjected to the impact bend downward;
the bendable portion is disposed, in an area where the decorative component is arranged, at a position dislocated from the leading-end portion of the decorative component and proximate to the leading-end portion;
the decorative component is arranged to extend across the bendable portion; and
two of the plurality of mounting projections are disposed such that one is disposed towards the leading-end portion with respect to the bendable portion and the other away from the leading-end portion with respect to the bendable portion.

7. The steering wheel of claim 6, wherein:
the decorative component includes a plurality of positioning projections that are inserted into corresponding insert holes formed in the base and position the decorative component;
one of the positioning projections is disposed between the two mounting projections one of which is disposed towards the leading-end portion and the other of which away from the leading-end portion each with respect to the bendable portion; and
the one of the positioning projections is positioned dislocated from the bendable portion and dislocated from a halfway point between the two mounting projections one of which is disposed towards the leading-end portion and the other of which away from the leading-end portion each with respect to the bendable portion.

8. The steering wheel of claim 1, wherein:
the rim includes a base on which the surface skin and the decorative component are mounted;
the decorative component includes a decorative portion on an upper side thereof and a mounting base that is disposed on a lower side and mounted on the base; and
the decorative portion has a greater width than the mounting base except in the leading-end portion.

9. The steering wheel of claim 8, wherein, in the leading-end portion of the decorative component, a side surface of the decorative portion and a side surface of the mounting base are generally flush, thereby forming a flat surface around the leading-end portion.

10. The steering wheel of claim 1, wherein:
the surface skin further includes an adjoining cover section that is disposed on a side of the curving edge of the leading-end portion of the decorative component and adjoins the main body of the curved-side cover section, the adjoining cover section being opposed to the non-curved-side cover section across the slit;
a leading edge of the adjoining cover section is located at a position proximate to and dislocated from the leading-end portion of the decorative component and joined with a corresponding edge of the main body of the curved-side cover section;
the rim includes a base on which the surface skin and the decorative component are mounted, and the base includes a positioning groove; and
a seam of the leading edge of the adjoining cover section and the corresponding edge of the main body of the curved-side cover section are fitted in the positioning groove.

11. The steering wheel of claim 10, wherein:
far-side edges of the main body of the curved-side cover section and the adjoining cover section which are joined together, and far-side edges of the extended portion of the curved-side cover section and the non-curved-side cover section which are joined together, which far-side edges being distant from the slit, are joined together in the inner circumference of the rim;
the decorative component, the curved-side cover section, the non-curved-side cover section, and the adjoining cover section cover a surface of the base in a circumferential direction of a cross section of the rim; and
the seam of the leading edge of the adjoining cover section and the edge of the main body of the curved-side cover section is dislocated from a seam of the joint edge of the extended portion of the curved-side cover section and the joint edge of the non-curved-side cover section in a direction extending along the rim.

* * * * *